US010290056B2

(12) United States Patent
Winter

(10) Patent No.: US 10,290,056 B2
(45) Date of Patent: May 14, 2019

(54) COMPUTER-IMPLEMENTED MATCHING METHOD AND ENGINE

(75) Inventor: Thomas Winter, Frankfurt (DE)

(73) Assignee: Deutsche Borse AG, Frankfurt am Main (DE)

(*) Notice: Subject to any disclaimer, the term of this patent is extended or adjusted under 35 U.S.C. 154(b) by 1234 days.

(21) Appl. No.: 13/477,016

(22) Filed: May 21, 2012

(65) Prior Publication Data

US 2013/0311346 A1    Nov. 21, 2013

(51) Int. Cl.
*G06Q 40/04* (2012.01)

(52) U.S. Cl.
CPC .................................. *G06Q 40/04* (2013.01)

(58) Field of Classification Search
CPC .............................. G06Q 40/00; G06Q 40/04
USPC ......................................................... 705/37
See application file for complete search history.

(56) References Cited

U.S. PATENT DOCUMENTS

| 2004/0254804 | A1* | 12/2004 | Peterffy et al. .................. 705/1 |
| 2007/0100731 | A1* | 5/2007 | Ward et al. ..................... 705/37 |
| 2008/0162378 | A1* | 7/2008 | Levine et al. ............... 705/36 R |
| 2009/0132412 | A1* | 5/2009 | Cleary Neubert et al. ..... 705/37 |
| 2009/0192933 | A1* | 7/2009 | Singer et al. .................. 705/37 |
| 2011/0066538 | A1* | 3/2011 | Liberman ............. G06Q 40/04 705/37 |
| 2011/0178913 | A1* | 7/2011 | Smith ............................. 705/37 |
| 2013/0179323 | A1* | 7/2013 | Mintz .................... G06Q 40/04 705/37 |
| 2015/0095207 | A1 | 4/2015 | Kodde |

FOREIGN PATENT DOCUMENTS

EP    1589450 A1    10/2005

OTHER PUBLICATIONS

First Examination report for application No. 498/CHE/2013, dated Dec. 13, 2018, pp. 6.

* cited by examiner

*Primary Examiner* — Namrata Boveja
*Assistant Examiner* — Liz P Nguyen
(74) *Attorney, Agent, or Firm* — Rimon PC; Marc S. Kaufman

(57) ABSTRACT

A computer implemented method and system for publishing best public limits and corresponding quantity and for matching an incoming outright order against price best match limits at corresponding quantities during the continuous trading phase is provided. An incoming outright order is entered in an incoming order book side. It is determined if the incoming outright order satisfies a matching condition by evaluating the sum of the incoming outright order limit and the best match limit of the outright order book side opposing to the incoming outright order book side wherein the best match limit of the outright order book side opposing to the incoming outright order book side also considers outright order book combinations resulting to the outright order book side opposing the incoming outright order book side.

16 Claims, 10 Drawing Sheets

Outright Order Book of Instrument I

| Ask Side | |
|---|---|
| Prc Lev 01 | ID41 10:23 17 @ 102.0 |
| Prc Lev 02 | ID44 10:26 26 @ 103.0 / ID64 10:45 10 @ 103.0 |
| Prc Lev 03 | ID17 10:10 15 @ 104.0 |
| Prc Lev 04 | ID47 10:29 15 @ 105.0 / ID52 10:33 10 @ 105.0 / ID89 10:54 15 @ 105.0 |
| ... | |

| Bid Side | |
|---|---|
| Prc Lev 01 | ID72 10:49 15 @ 99.0 / ID93 10:57 13 @ 99.0 |
| Prc Lev 02 | ID11 10:07 11 @ 98.0 / ID15 10:28 28 @ 98.0 / ID73 10:51 30 @ 98.0 / ID75 10:55 10 @ 98.0 |
| Prc Lev 03 | ID33 10:18 40 @ 97.0 / ID39 10:21 25 @ 97.0 / ID58 10:41 23 @ 97.0 |
| ... | |

FIG. 1a

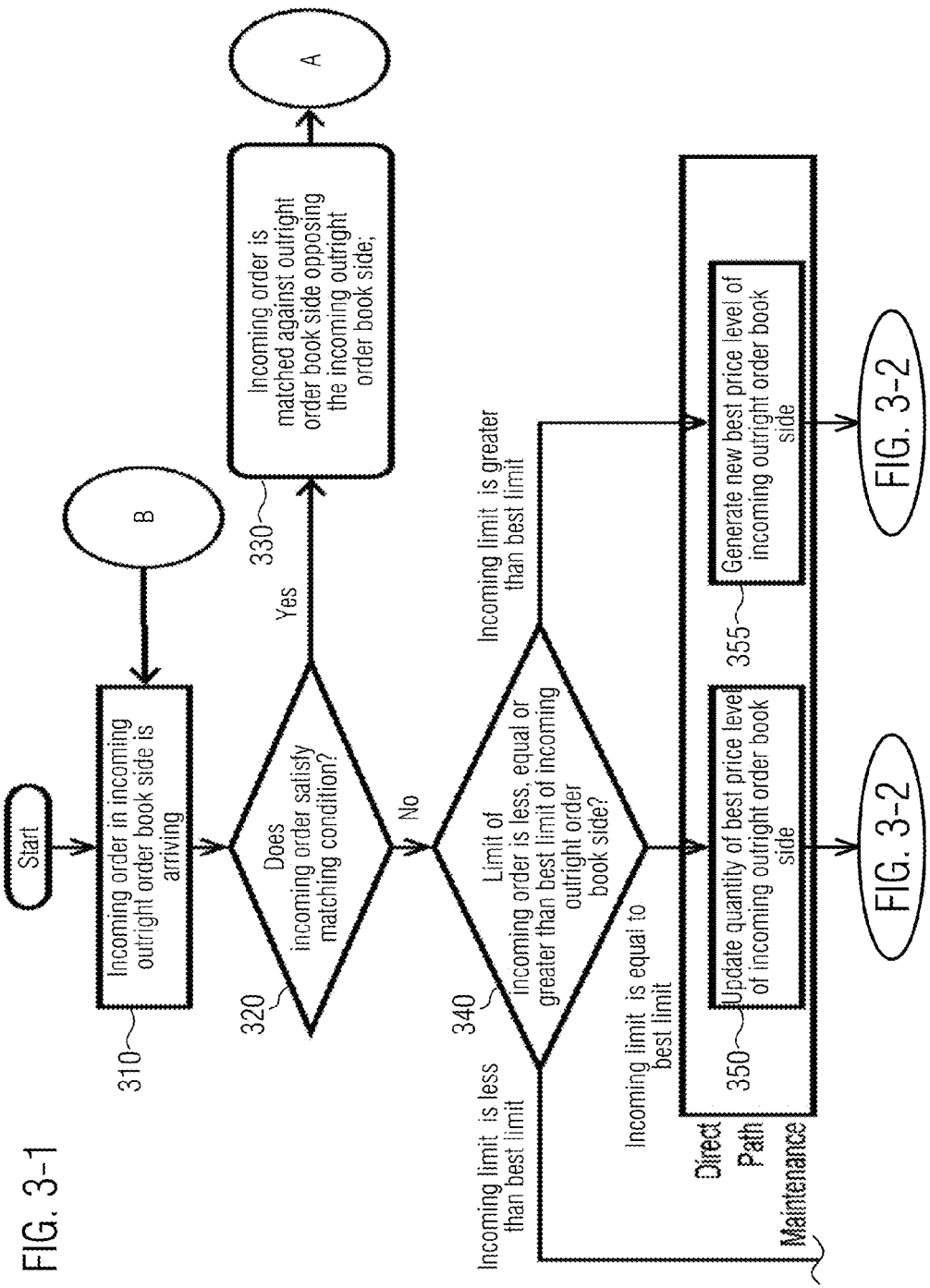

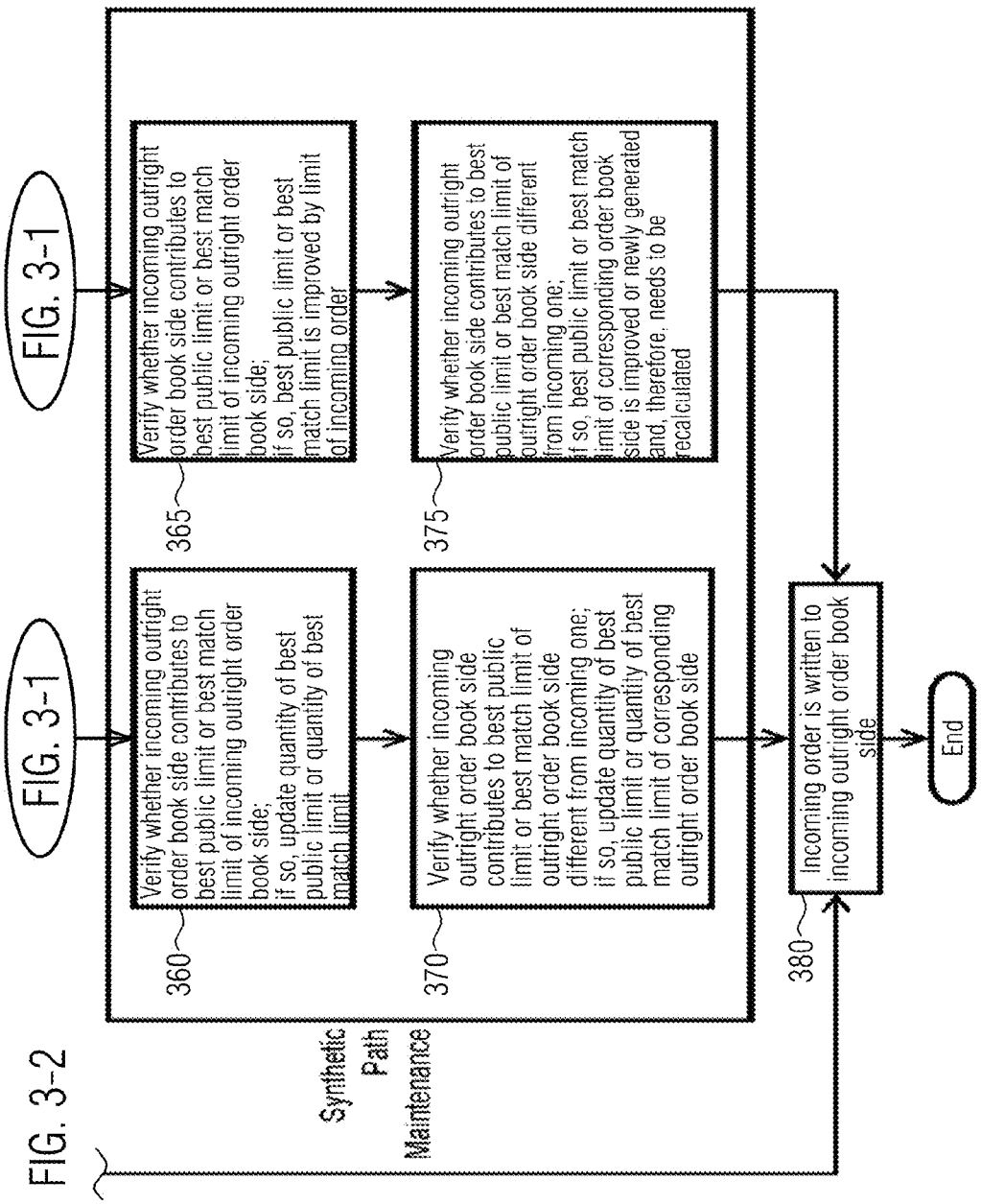

COMPUTER-IMPLEMENTED MATCHING METHOD AND ENGINE

BACKGROUND OF THE INVENTION

1. Field of the Invention

The invention relates to computer systems and computer implemented methods for performing matching in financial instrument markets and, more particularly, performing matching in derivative markets.

2. Description of the Related Art

Derivates such as futures or options have become increasingly important in the world of finance. Futures and options are now traded actively on many exchanges throughout the world. A derivative is a financial instrument whose value depends on or derives from the values of other, more basic underlying variables. Very often, the variables underlying derivatives are the prices of traded assets. A stock option, for example, is a derivative whose value is dependent on the price of a stock.

A derivative exchange is a market where individuals trade standardized derivatives contracts that have been defined by the exchange. Traditionally, derivatives traders have met on the floor of an exchange and used shouting and a complicated set of hand signals to indicate the trades they would like to carry out. This is known as the open outcry system. In recent years, exchanges have increasingly moved from the open outcry system to electronic trading.

A futures outright contract is an agreement between two parties to buy or sell an asset at a certain time in the future for a certain price. An options outright contract specifies an agreement between two parties for a futures transaction on an asset at a reference price (strike price). The buyer of the option gains the right, but not the obligation, to engage in that transaction, while the seller incurs the corresponding obligation to fulfill the transaction. Options and futures contracts are normally traded on an exchange such as the Eurex.

Generally, there are many different kinds of outright contracts, reflecting the many different kinds of tradable assets (also denoted as underlying in the context of derivatives) on which the outright contract may be based. Underlyings of an outright contract may be, for instance, commodities, securities such as stocks, bonds, currencies or intangibles, such as interest rates and indexes. Futures or options on currencies, financial securities or on financial indices are also called financial futures or financial options, respectively.

Derivatives traded on an exchange such as the Eurex may be associated with several expiration dates. Each outright contact is associated with an expiration date.

Spread contracts (also referred to as double leg combinations, outright spread contracts, calendar spread contracts or simply spreads) are double leg outright contracts combining two different single leg outright contracts with a leg ratio equal to one for both single leg outright contracts but different buy/sell indicators. Thus, a spread may be defined as the simultaneous purchase of one single leg outright contract and the sale of another single leg outright contract.

When using an electronic trading system, the bid and ask orders of a single leg outright derivative contract are stored in the corresponding single leg outright order book and the bid and ask orders of a double leg outright contract are stored in the corresponding double leg outright order book independent of the single leg outright orders of the single leg outright contracts contained in a double leg outright contract. An order book is crossed if the best bid price is equal to or greater than the best ask price. During the continuous trading phase of an exchange, in case an incoming order results to a crossed order book, the incoming order needs to be executed immediately against book orders of the outright order book side opposite to the incoming order until the crossed order book situation is resolved. Thus, during the continuous trading phase, a crossed order book situation in an outright contract never occurs. The immediate execution of an incoming order against one or several book orders is also referred to as matching.

In conventional electronic trading systems of derivatives exchanges, matching of incoming orders exclusively considers the outright order book where the incoming order is related to but does not take into account matching opportunities which may result from combinations of single and double leg outright order books different from the outright order book of the incoming order. This results in a non-optimal matching of derivatives.

SUMMARY OF THE INVENTION

According to an embodiment, a computer implemented method for maintaining combinations of outright order book sides of a derivative product is provided. A best public limit of an outright order book side of a plurality of outright order book sides is determined by considering combinations of outright order book sides resulting to said outright order book side based on allowed public paths available for the derivative product. The best public limit is exclusively available for the publication of a best price level of said outright order book side to the outside world. In addition, a best match limit of said outright order book side is determined by considering combinations of outright order book sides resulting to said outright order book side based on allowed match paths available for the derivative product. The best match limit is exclusively available for matching of said outright order book side.

According to another embodiment, a computer-readable medium is provided which has computer-executable instructions that, when executed by a computer, cause the computer to perform a method for maintaining combinations of outright order book sides of a derivative product is provided. A best public limit of an outright order book side of a plurality of outright order book sides is determined by considering combinations of outright order book sides resulting to said outright order book side based on allowed public paths available for the derivative product. The best public limit is exclusively available for the publication of a best price level of said outright order book side to the outside world. In addition, a best match limit of said outright order book side is determined by considering combinations of outright order book sides resulting to said outright order book side based on allowed match paths available for the derivative product. The best match limit is exclusively available for matching of said outright order book side.

According to yet another embodiment, a matching engine which comprises a processor configured for executing computer-executable instructions and a memory coupled to the processor is provided. The memory comprises computer-executable instructions that, when executed by the processor, cause the processor to perform a method for maintaining combinations of outright order book sides of a derivative product is provided. A best public limit of an outright order book side of a plurality of outright order book sides is determined by considering combinations of outright order book sides resulting to said outright order book side based on allowed public paths available for the derivative product.

The best public limit is exclusively available for the publication of a best price level of said outright order book side to the outside world. In addition, a best match limit of said outright order book side is determined by considering combinations of outright order book sides resulting to said outright order book side based on allowed match paths available for the derivative product. The best match limit is exclusively available for matching of said outright order book side.

BRIEF DESCRIPTION OF THE DRAWINGS

The accompanying drawings are incorporated into and form a part of the specification for the purpose of explaining the principals of the invention. The drawings are not to be construed as limiting the invention to only the illustrated and described examples of how the invention can be made and used. Further features and advantages will become apparent from the following and more particular description of the invention, as illustrated in the accompanying drawings, wherein:

FIG. 1a is a schematic illustration of a data structure for an example of an outright order book exemplary containing different bid and ask orders prioritized by their limit and entry time;

FIGS. 3-1 and 3-2 is a flow chart illustrating a method for maintaining an incoming outright order book side during the continuous trading phase according to an embodiment of the invention;

DETAILED DESCRIPTION OF THE INVENTION

Figure 1B:
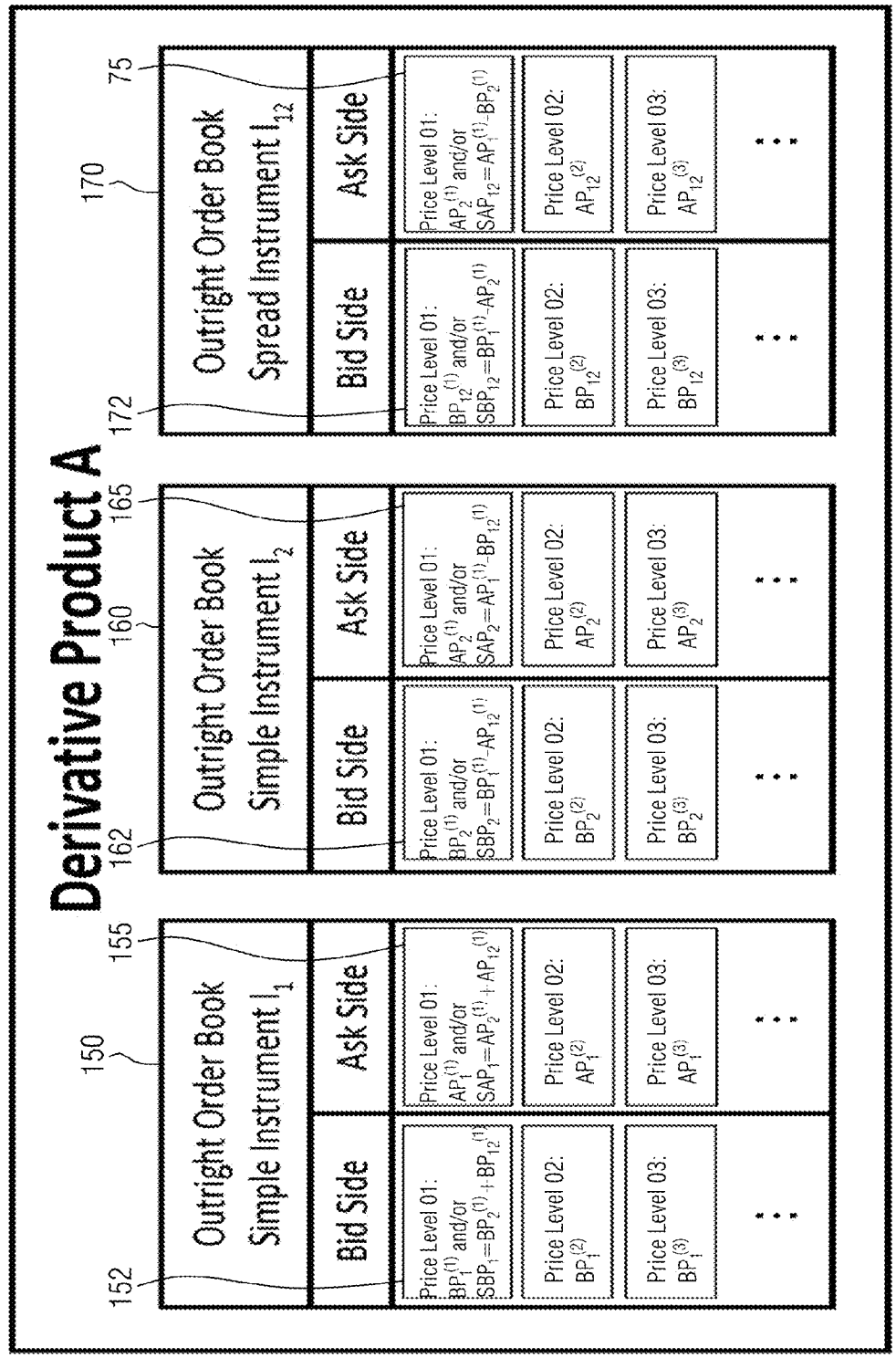
FIG. 1b is a schematic illustration of a data structure for an example of synthetic combinations resulting from two single leg outright contracts and one double leg outright contract whose legs are given by the two single leg outright contracts.

The illustrative embodiments of the present invention will be described with reference to the Figure drawings, wherein like elements and structures are indicated by like reference numbers.

Generally, the present invention provides a computer implemented method, a computer-readable medium and a system for matching an incoming outright order against the price best orders of an outright order book side opposite to the incoming outright order for a derivative during a continuous trading phase is provided, wherein the outright order book side opposite to the incoming outright order is supplemented by one or several combinations of additional single and double leg outright order book sides which result to the same outright order book side opposite to the incoming order. Only those combinations of additional single and double leg outright order book sides are considered where the corresponding combination of price best orders results to a limit which is equal to or which improves the best limit of the outright order book side opposite to the incoming order. Such a combination of outright order book sides is denoted as synthetic path, and the resulting limit of the price best outright orders specified by the synthetic path is denoted as synthetic price. The order book sides contributing to a synthetic path are denoted as generating outright order book sides of such a synthetic path.

The present invention may be operational with numerous general purpose or special purpose computing systems environments or configurations. Examples of well known computing systems, environments and/or configurations that may be suitable for use with the invention may include, but are not limited to, personal computers, server computers, handheld or laptop devices, multi-processor systems, microprocessor based systems, network PCs, mini-computers, tablet computers, smartphones, mainframe computers, distributed computing environments that include any of the above system or devices, and the like.

The invention may be described in the general context of computer-executable instructions, such as program modules, recorded on tangible computer readable media and being executed by one or more computing devices. Generally, program modules include routines, programs, objects, components, data structures, et cetera that work in combination to perform particular tasks or implement particular abstract data types. The general purpose or special purpose computing system environments or configurations may be programmable using a high level computer programming language. In some embodiments, the general purpose or special purpose computing system environments or configurations may also use specially programmed, special purpose hardware. The computing system can include various computing devices, such as servers, and personal computers. The modules are executed by one or more processors to carry out the disclosed functions.

As already mentioned, the invention may also be practiced in distributed computing environments where tasks are performed by remote processing devices that are linked through a communication network. In a distributed computing environment, program modules may be located in both local and remote computer storage media including memory storage devices.

Figure 4:
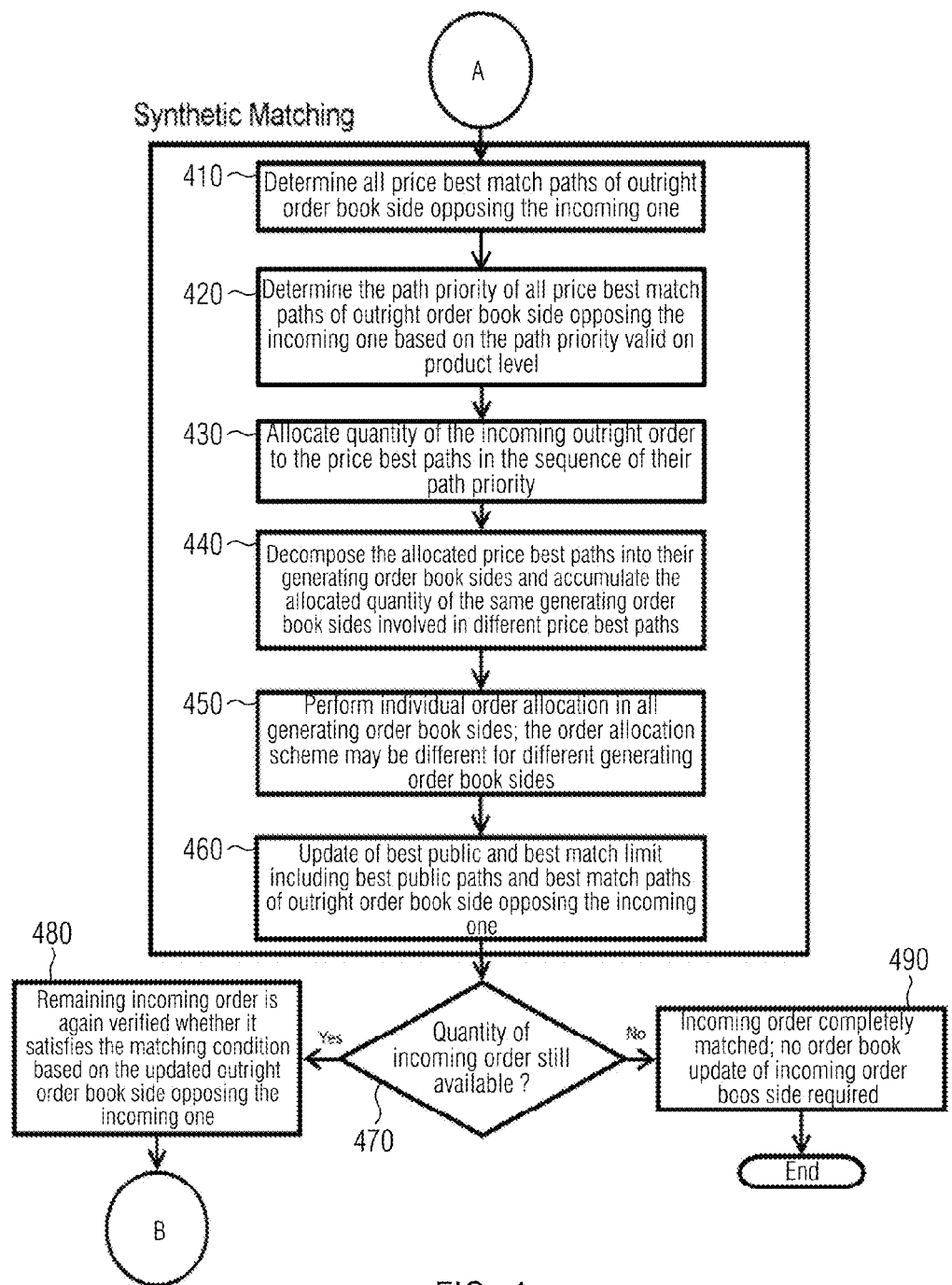
FIG. 4 is a flow chart illustrating a method for matching an incoming outright order according to an embodiment of the invention.
Figure 5:
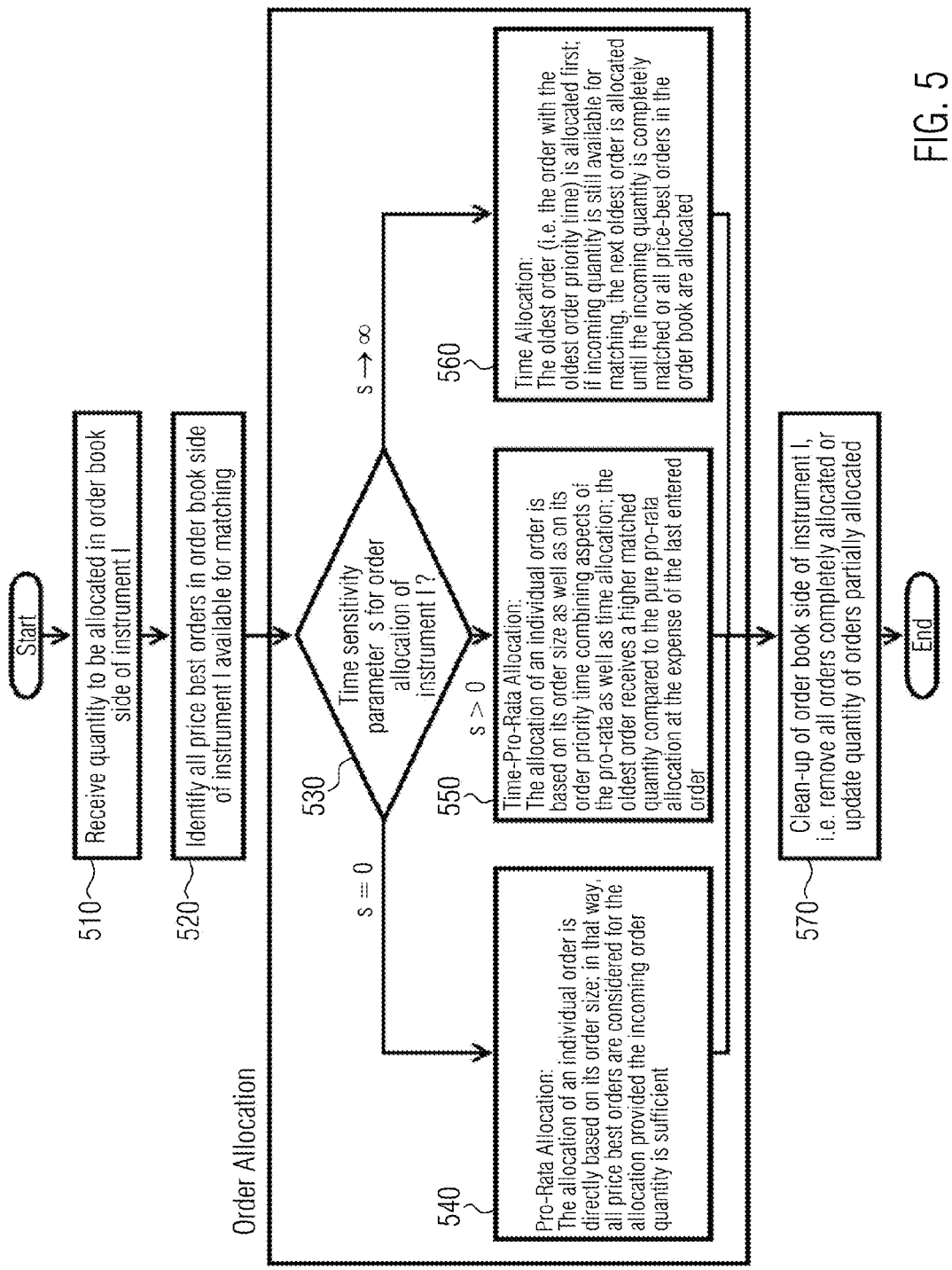
FIG. 5 is a flow chart illustrating a method for allocating quantities matched against a plurality of book orders of a price level selected for execution according to an embodiment of the present invention.

For instance, a matching engine comprising a processor and a memory coupled to the processor may perform the computer-implemented methods described with regard to FIGS. 3 to 5.

In the following, many embodiments of the invention are described with regard to futures in more detail. However, it is well understood by the person skilled in the art that the embodiments of the present invention are not restricted to futures but relate to derivatives in general. Thus, the skilled person may appreciate that the principals of the present invention may also be applicable to other derivatives such as options or swaps.

A futures contract is a binding obligation enforceable at law to buy or sell a stated quantity of a specified asset on a specified date in the future at a predetermined price. As stated in the background section, derivatives traded on an exchange may be associated with several expiration dates per year. For instance, the derivatives of embodiments of the present invention may be associated with N expiration dates, wherein N is a natural number. The front contract may be denoted by contract "1", wherein the contract associated with the longest expiration date may be denoted with "N".

Generally, It may be assumed that N single leg outright contracts (also referred to as single leg instruments) denoted by l1, l2, . . . , lN can be uniquely ordered by some sorting criterion where N represents the number of single leg outright contracts. For single leg outright futures contracts, the sorting criterion is the expiration time, i.e. the front month futures contract is ranked first and N provides the number of expirations valid for this futures product. For single leg options contracts, the sorting criteria are expiration time (first criterion), exercise price (second criterion) and option class (Call versus Put, third criteria), i.e. the front month call contract with the smallest exercise price is ranked first.

A double leg outright contract (also denoted as "spread instrument") defines an instrument where two single leg outright contracts are traded simultaneously, i.e. the double leg outright contract lk–l contains a single leg outright contract lk and a single leg outright contract ll where k, l, =1, . . . , N, k<l. The corresponding single leg outright contracts lk and ll are denoted as leg instruments or as legs of the double leg outright contract lk–l. By definition, the first leg of a double leg outright contract always refers to the single leg outright contract which is ordered first compared to the second leg implying k<l for a double leg outright contract lk–l. A buy (sell) order of a double leg outright contact lk–l, k<l, means that the first leg lk is bought (sold) while the second leg ll is sold (bought). Double leg outright contracts are traded independently form the corresponding single leg outright contracts and, consequently, have their own order book independent from the single leg outright contracts. Typically, double leg outright contracts for futures are futures calendar spreads while double leg outright contracts for options are bull spreads, bear spreads, diagonal bull/bear spreads, conversions, etc. Throughout the present application, it is assumed that the leg ratio of a double leg outright contract is one and there is only one contract bought and one contract sold.

Outright order books may be stored in electronic trading systems as tables. As illustrated in FIG. 1a, one side 110 of an outright order book 100 of an instrument I, the bid side, may comprise buy orders and the other side 120, the ask side, of this table 100 may comprise sell orders. Discussing outright order books on the example of futures in more detail, for the bid side 110, contracts of one or more limit orders being associated with the same limit may be merged into one price level. Similarly, for the ask side 120, contracts of one or more limit orders being associated with the same limit may be merged into one price level. Each price level may be associated with a limit. The table 100 may store any number of different price levels.

Generally, for the bid side 110, the best bid (the highest limit a market participant is willing to pay for a certain volume of contracts of the futures) may be merged into the top most price level 115-1. The contracts associated with the lowest limit a market participant is willing to pay for a certain volume of contracts of the futures may be merged into the lower-most price level. Thus, the price levels on the bid side may be ordered descending with regard to the associated limits. For the ask side 120, on the other hand, the best ask (the lowest limit a marked participant is willing to sell a certain volume of contracts of the futures) may be merged into the top most price level 125-1. The contracts associated with the highest limit a market participant is willing to sell a certain volume of contracts of the futures may be merged into the lower-most price level. Accordingly, the price levels on the ask side may be ordered ascending with regard to the associated limits. The orders listed in the top most price levels of the bid and ask side may also be referred to as price best orders of the bid and ask side.

During the continuous trading phase, the order book 100 is always uncrossed, i.e. the best price level of the bid side is always lower than the best price level of the ask side. As an example and not limitation, FIG. 1a shows three price levels 115-1, 115-2 and 115-3 of the bid side 110 of outright order book 100 and four price levels 125-1, 125-2, 125-3 and 125-4 of the ask side 120 of outright order book 100. Each price level comprises at least one order. For instance, price level 115-1 comprises outright bid orders 130 and 135 and price level 125-1 comprises outright ask order 140. Each order in the order book 100 may be associated with a unique order ID, an order entry time, a limit and a volume. For instance, bid order 130 may be associated with the order ID "ID72", the order entry time "10:49", the volume "15" and the bid limit of "99.0". Accordingly, the price level 130 may be associated with the limit "99.0".

Referring now to FIG. 1b, although a double leg outright contract is independent of its single leg components and has its own order book, it is possible to replace a double leg outright order in contract lkl by a combination of single leg outright orders in contract lk and in contract ll, where k and l are integers with k<l representing different specific outright contracts. A buy spread order in contract lkl may be replaced by a combination of a buy order in contract lk and a sell order in contract ll. The bid price of such a synthetic spread order denoted by SBPkl is given by $$SBP_{kl}=BP_k-AP_l \text{ with } k<l$$

where $BP_k$ denotes the bid price of contract $l_k$ and $AP_l$ indicates the ask price of contract $l_l$. The quantity $SBQ_{kl}$ of such a synthetic buy spread order is given by $$SBQ_{kl}=\text{MIN}\{BQ_k; AQ_l\}$$

where $BQ_k$ and $AQ_l$ denotes the bid and ask quantity corresponding to the bid price $BP_k$ and ask price $AP_l$, respectively.

A sell spread order in contract lkl may be replaced by a combination of a sell order in contract lk and a buy order in contract ll. The synthetic ask price SAPkl of such an order combination is given by SAPkl=APk−BPl, while the synthetic ask quantity is given by SAQkl=MIN {AQk; BQl}.

It is also possible to combine a single leg outright order in contract lk with a spread order in the double leg outright contract lkl with k<l to result in a synthetic single leg outright order of contract ll. A synthetic buy order in contract ll is generated by a combination of a buy order in contract lk and a sell spread order in contract lkl. The corresponding synthetic bid price and bid quantity are given by $$SBP_l=BP_k-AP_{kl} \text{ and } SBQ_l=\text{MIN}\{BQ_k; AQ_k\}, k<l$$

respectively. A synthetic sell order in contract $l_l$ is generated by a combination of a sell order in contract $l_k$ and a buy spread order in contract $I_k$. The corresponding synthetic ask price and ask quantity are given by $$SAP_l=AP_k-BP_k, \text{ and } SAQ_l=\text{MIN}\{AQ_k\}; k<l$$

respectively. Only book orders from the best price level 152, 155, 162, 165, 172 and 175 (price level 01) of an outright order book 150, 160 and 170 may be taken into account for synthetic combinations. In case a synthetic combination results to a synthetic order limit which does not join or improve the best outright price level, the synthetic combination may be dismissed.

As previously stated, during the continuous trading phase, the immediate execution of an incoming outright order against the outright order book side opposite to the incoming order is also be referred to as matching. An incoming order exclusively matching against the outright order book side opposing to the incoming order is called a direct match event and orders stored in the outright order book side opposite to the incoming order can be directly allocated against the incoming order. Additionally, an incoming outright order can also match against a combination of single and double leg outright order book sides different from the outright order book side opposing the incoming order. Such a match event is denoted as a synthetic match event. Thus, during direct matching, the matched quantities of the incoming order book side is equal to the matched quantities on the opposite order book side of the same outright contract. For a pure synthetic match event, there is no matched quantity on the outright order book side of the same contract but opposite to the order book side of the incoming order.

For the following discussion with regard to FIGS. 2a to 5, it is assumed that N single leg outright contracts considered for synthetic matching can be uniquely ordered by some sorting criterion where N represents any positive integer larger than 1. For single leg outright futures contracts, the sorting criterion may be the expiration time, i.e. the front month futures contract is ranked first. For single leg options contracts, the sorting criteria are expiration time (first criterion) and exercise price (second criterion), i.e. the front month contract with the smallest exercise price is ranked first.

Figure 2A:
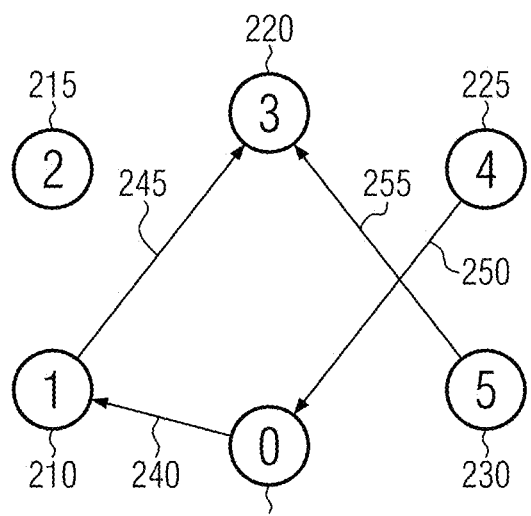
FIGS. 2a to 2c illustrate the concept of synthetic orders according to embodiments of the present invention.
Figure 2B:
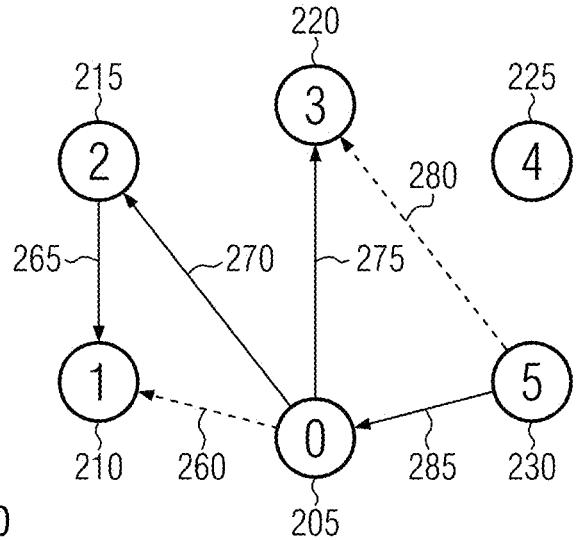
Figure 2C:
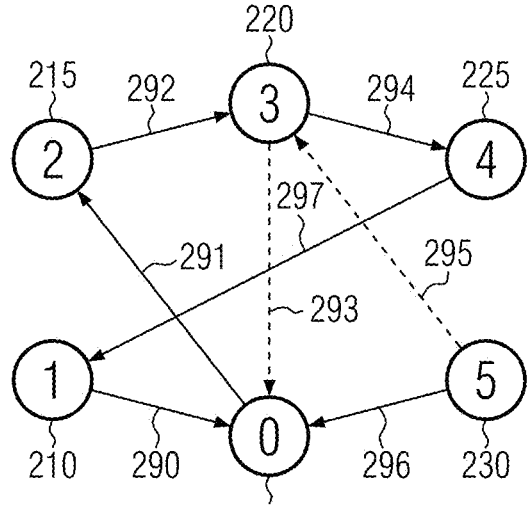

Discussing FIGS. 2a to 2c on the example of futures, each of the nodes 205, 210, 215, 220, 225 and 230 is labeled with a number. Nodes 210, 215, 220, 225 and 230 are labeled with 1, 2, 3, 4 and 5 to indicate the numbered outright contracts 1, 2, 3, 4 and 5, respectively. Node 205 is labeled with 0 to indicate that this node does not represent any tradable series of the futures. For a futures product, the outright contract 1 may be associated with an expiration date nearest to the date of a current trading day, while the outright contract 5 may be associated with an expiration date farthest from the date of the current trading day. The expiration date of outright contracts 2, 3 and 4 may lie between those expiration dates wherein an ascending number indicates an older expiration date.

Generally, a notation for an order (sell contract k, buy contract l) may be (k,l) with k,l=1, ..., N,k≠l. A double leg buy order of contract k–l may be written as (l,k), wherein k is smaller than l. A double leg sell order of contract k–l may be written as (l,k), wherein k is smaller than l. Thus, for futures product with N=5 expirations, edge 245 is a double leg sell order of spread 1-3, which is written as (1,3) and edge 255 is a double leg buy order of spread 3-5 and is written as (5,3).

A single leg buy order of a contract l may be written as (0,l), where l=1, ..., N and a single leg sell order of contract k may be written as (k,0), wherein k=1, ..., N. Thus, in the embodiment of FIG. 2a for a futures product with N=5 expirations, the edge 240 is a buy order of contract 1 which is written as (0,1) and edge 250 is a single leg sell order of contract 4 which is written as (4,0).

Synthetic matching may consider synthetic book orders of different length. Outright orders may be denoted as synthetic orders of length 1. Synthetic orders of length 2 are composed of two different outright orders. A synthetic buy order in contract $k, 1 \leq k \leq N$, of length 2 may be written as $(0,i,k)=(0,i)\oplus(i,k)$ where i=1, ..., N,i≠k implying that the synthetic buy order of the single leg outright contract k is generated by an outright buy order of single leg outright contract i and an outright spread order from the double leg outright order book side (i, k). A synthetic sell order in contract $l, 1 \leq l \leq N$ of length 2 may be written as $(i,j,0)=(l,j)\oplus(j,0)$ where j=1, ..., N,j≠l implying that the synthetic sell order in the single leg outright contract l is generated by an outright sell order in the single leg outright contract j and a spread order contains in the double leg outright order book side (l,j). A synthetic sell order in spread $k-l, 1 \leq k < l \leq N$, of length 2 may be written as $(k,m,l)=(k,m)\oplus(m,l)$ where m=0, ..., N,m≠k≠l. Note (l,m,k) with k<l represents a synthetic buy order of spread k-l.

Accordingly, referring to FIG. 2b, synthetic order 260 may be written as (0,2,1) and represents a synthetic buy order of single leg outright contract 1, which is generated by the outright order 265 representing a buy spread order of double leg outright contract 1-2 and the outright order 270 indicating a buy order of single leg outright contract 2. Synthetic order 280 may be written as (5,0,3) and represents a synthetic buy spread order of double leg outright contract 3-5, which is generated by the sell order of single leg outright contract 5 indicated by 285 and by the buy order of single leg outright contract 3 indicated by 275.

Synthetic orders of length 3 are composed of three different outright orders. A synthetic buy order in the single leg outright contract $k, 1 \leq k \leq N$ of length 3 is written as $(0,i,j,k)=(0,i)\oplus(i,j)\oplus(j,k)$ where i,j=1, ..., N,i≠j≠k implying that the synthetic buy order in contract k is generated by an outright order on the buy side of the single leg outright order book i, an outright spread order from the double leg outright order book side (i, j) and by a outright spread order from the double leg outright order book side (j, k). A synthetic sell order in contract $l, 1 \leq l \leq N$, of length 3 is written as $(l,i,j,0)=(l,i)\oplus(i,j)\oplus(j,0)$ where i,j=1, ..., N,i≠j≠l implying that the synthetic sell order in contract l is generated by an outright order on the sell side of the single leg outright order book j, an outright spread order from the double leg outright order book side (i, j) and by an outright spread order from the double leg outright order book side (l, i). Analogously, a synthetic sell order in spread $k-l, 1 \leq k < l \leq N$, of length 3 is written as $(k,m,n,l)=(k,m)\oplus(m,n)\oplus(n,l)$ where m,n=0, ..., N,m≠n≠k≠l. Note: (l,m,n,k) with k<l represents a synthetic buy order of spread k-l.

In general, a synthetic order of length $\lambda$ with $1 \leq \lambda \leq N$ is defined by $(k_0, \ldots, k_\lambda)=(k_0, k_1)\oplus \ldots \oplus(k_{\lambda-1}, k_\lambda)$ where $k_0 \neq \ldots \neq k_\lambda$ and $(k_{i-1}, k_i)$, i=1, ..., $\lambda$ represent the outright order book sides generating the synthetic order $(k_0, \ldots, k_\lambda)$. Accordingly, and referring to FIG. 2c, the synthetic order 293 may be written as (3,4,1,0) and represents a synthetic sell order of contract 3, which is built from outright orders 294, 297 and 290. Synthetic order 295 may be written as (5,0,2,3) and represents a buy order of spread 3-5, which is built from outright orders 296, 291 and 292.

Analog to synthetic orders, all price best orders of the generating outright order book sides $(k_0, k_1) \ldots (k_{\lambda-1}, k_\lambda)$ define the synthetic path $(k_0, \ldots, k_\lambda) = (k_0, k_1) \oplus \ldots \oplus (k_{\lambda-1}, k_\lambda)$ with $k_0 \neq \ldots \neq k_\lambda$ of length $\lambda$.

A limit of an order (k,l),k≠l, denoted by limit L(k,l) is defined by $L(0,l)=BP_l$—in case of a buy order of contract l with bid price $BP_l$ $L(k,0)=(-1)*AP_k$—in case of a sell order of contract k with ask price $AP_k$ L(k,l)=$BP_{lk}$—in case of a buy order of spread l-k with k>l>0 and bid price $BP_{lk}$ L(k,l)=(-1)*$AP_{kl}$—in case of a sell order of spread k-l with 0<k<l and ask price $AP_{kl}$ A limit (also referred to as path limit) PL of a synthetic order (also referred to as synthetic path) $(k_0, \ldots k_\lambda)=(k_0, k_1)\oplus \ldots \oplus(k_{\lambda-1}, k_\lambda)$, of length $\lambda$ with $1 \leq \lambda \leq N, k_0 \neq \ldots \neq k_\lambda$ is defined by $PL(k_0, \ldots, k_\lambda)=\Sigma_{n=1}^{\lambda} L(k_{n-1}, k_n)$ where $L(k_{n-1},k_n)$ denotes the best limit of the order book $(k_{n-1},k_n)$.

For defining a synthetic bid price denoted by SBP and a synthetic ask price denoted by SAP, assume a synthetic order or synthetic path $(k_0, \ldots, k_\lambda)=(k_0, k_1)\oplus \ldots \oplus(k_{\lambda-1},k_\lambda)$ of length $\lambda$ with $1 \leq \lambda \leq N, k_0 \neq \ldots \neq k_\lambda$. Then, the synthetic bid price of contract $k_\lambda$ is given by $SBP^{(\lambda)}$ $(k_0, \ldots, k_\lambda)=PL(k_0, \ldots, k_\lambda)$ whereby $k_0=0$ the synthetic ask price of contract $k_0$ is given by $SAP^{(\lambda)}$ $(k_0, \ldots, k_\lambda)=(-1)*PL(k_0, \ldots, k_\lambda)$ whereby $k_\lambda=0$ the synthetic bid price of spread $k_\lambda$-$k_0$ is given by $SBP^{(\lambda)}(k_0, \ldots, k_\lambda)=PL(k_0, \ldots, k_\lambda)$ whereby $k_0>k_\lambda>0$ the synthetic ask price of spread $k_0$-$k_\lambda$ is given by $SAP^{(\lambda)}(k_0, \ldots, k_\lambda)=(-1)*PL(k_0, \ldots, k_\lambda)$ whereby $0<k_0<k_\lambda$ For defining Synthetic Bid and Ask Quantities, assume a synthetic order or synthetic path $(k_0, \ldots, (k_0,k_1)\oplus \ldots \oplus(k_{\lambda-1},k_\lambda)$ of length $\lambda$ with $1 \leq \lambda \leq N, k_0 \neq \ldots \neq k_\lambda$. Then, its synthetic quantity PQ is given by $PQ^{(\lambda)}(k_0, \ldots, k_\lambda)=MIN\{Q(k_0,k_1), \ldots, (k_{\lambda-1},k_\lambda)\}$, where $Q(k_{n-1}, k_n), n=1, \ldots, \lambda$, represents the bid or ask quantity of the orders $(k_{n-1},k_n)$ involved in the synthetic order $(k_0, \ldots, k_\lambda)$ or the quantity of all price-best orders of order book sides $k_{n-1},k_n$ involved in the path, respectively. For defining a matching condition and a matching cycle, assume that an incoming order $(h, g)^{inc}, h \neq g$, is submitted for execution against the synthetic order $(k_0, \ldots, k_\lambda)$ with $h=k_\lambda$ and $g=k_0$ and length. $\lambda \leq N$, i.e. $(h.g)^{inc}=(k_\lambda,k_0)^{inc}$. Then, the incoming order and the synthetic book order create a closed path given by $(k_0,k_1)\oplus \ldots \oplus(k_{\lambda-1},k_\lambda)\oplus(k_\lambda,k_0)^{inc}=(k_0, \ldots, k_\lambda,k_0)$ During the continuous trading phase, the incoming order $(h, g)^{inc}=(k_\lambda,k_0)^{inc}$ is immediately executable against the synthetic order $(k_0, \ldots, k_\lambda)$ with $h=k_\lambda$ and $g=k_0$ if and only if the following relation defined as Matching Condition holds:

$PL(k_0,k_1)\oplus \ldots \oplus(k_{\lambda-1},k_\lambda)\oplus(k_\lambda,k_0)^{inc})=PL(k_0, \ldots, k_\lambda,k_0) \geq 0$ A closed path satisfying the matching condition is denoted as Matching Cycle. As stated above, an outright order $(k_0,k_1)$, is regarded as order of length $\lambda=1$. In case the incoming order $(k_1,k_0)^{inc}$ is executable directly against the other side of the order book $(k_0,k_1)$, a matching cycle of length 2 is generated, i.e. a closed path with attribute $PL(k_0,k_1,k_0) \geq 0, k_0 \neq k_1$ is indicating a crossed order book situation.

Throughout the present specification, a synthetic order $(k_0, \ldots, k_\lambda)$ with length $\lambda$ may also include the outright order $(k_0,k_1)$ as a synthetic order of length $\lambda=1$. Analogously, the path $(k_0, \ldots, k_\lambda)$ with length $\lambda$ may also include the path $(k_0,k_1)$ of length $\lambda=1$ which comprises all price best orders of the outright order book side $(k_0,k_1)$. Consequently, the length $\lambda$ of a synthetic order or path may vary between 1 and N, i.e. $1 \leq \lambda \leq N$.

Prior to discussing a method for matching an incoming outright order in the continuous trading phase according to embodiments of the invention with reference to FIGS. 3-1 and 3-2 (also referred to as FIG. 3), the impact of synthetic combinations with regard to matching of incoming outright orders will be discussed. For embodiments of the present invention, the following two general considerations apply:

1. The larger the length of a synthetic order, the more unattractive the synthetic prices are.

To see this aspect, assume a synthetic bid order $(k_0, \ldots, k_\lambda)$ of length $\lambda$ and a synthetic ask order $(k_\lambda, \ldots, k_0)$ opposite to the synthetic bid order in all order book sides. Then, the bid-ask spread of these synthetic orders is given by $$LP(k_\lambda, \ldots, k_0) + LP(k_0, \ldots, k_\lambda) = \sum_{n=1}^{\lambda} LP(k_n, k_{n-1}) + LP(k_{n-1}, k_n)$$

which translates to the equation $$SAP^{(\lambda)}(k_\lambda, \ldots, k_0) - SBP^{(\lambda)}(k_0, \ldots, k_\lambda) = \sum_{n=1}^{\lambda} (AP_{k_{n-1}k_n} - BP_{k_{n-1}k_n})$$

i.e. the bid-ask spread of two synthetic orders which are opposite to each other in all order books sides is identical to the sum of the bid-ask spread of all these order books. Consequently, the larger the length (i.e. the more order books are involved in the synthetic paths), the larger the resulting bid-ask spread of the corresponding synthetic orders.

2. The larger the length of synthetic orders, the more calculation effort is required to evaluate the attributes of synthetic orders or paths like best price and corresponding quantity.

To be consistent from a mathematical point of view, all synthetic orders with length N should be considered. However, the calculation of prices and quantities for synthetic orders or paths up to a length 2=N may not be manageable since calculation effort increases dramatically for synthetic orders or paths with larger length.

From an exchange point of view, consequently, the restriction of synthetic orders or paths with respect to their length is the most effective approach to support the concept of synthetic order generation on the one hand and to ensure a synthetic matching algorithm with efficient calculation effort on the other hand.

The following considerations apply to synthetic paths (k0, . . . , kλ), k0≠ . . . kλ, i.e. all price best orders of the outright order book sides (ki–1, ki), i=1, . . . , λ, are considered instead of individual orders. The outright order book sides (ki–1, ki), i=1, . . . , λ, generating the synthetic path (k0, . . . , kλ), k0≠ . . . ≠kλ, are denoted as generating outright order book sides.

In order to restrict synthetic matching combinations, the following basic rules may be introduced:

1) Basic Rule for Publication:

For publication of inside market (i.e. best bid and best ask prices and corresponding quantities), synthetic orders or paths $(k_0, \ldots, k_\lambda)$ of length $\lambda$ are exclusively considered up to a maximum public path length of $\lambda_0$ independent of N.

2) Basic Rule for Matching:

To avoid the publication of crossed order books, the matching engine may internally consider matching cycles $(l_0, \ldots, l_\mu), l_0=l_\mu$, of cycle length $\mu$ up to a maximum matching cycle length of $\mu_0=MIN\{2*\lambda_0;$ N+1}. This results to synthetic orders or paths $(l_0, \ldots, l_\lambda, l_0)$ with length $\lambda=\mu-1$.

The distinction between paths considered for publication and paths considered for internal matching is required to avoid crossed outright order book situations during the continuous trading phase.

For instance, provided that $N \geq 3$ and in case the maximum public path length $\lambda_0$ is set to 2, the basic rules 1) and 2) result to synthetic paths:
- up to a length of $\lambda \leq 2$ which are internally considered for matching and for publication;
- of length $\lambda=3$ which are internally considered for matching but not for publication;
- of length $\lambda \geq 4$ which are not considered at all.

In order to further restrict the number of synthetic combinations to those with high relevance to financial derivatives markets, refined basic rules may be introduced to exclude pure complex synthetic paths which are defined as synthetic spread paths exclusively containing spread order books.

Refined basic rules may be:

a) Refined Basic Rule for Publication:

In addition to the basic rule 1), only those synthetic paths are considered which contain at least one simple instrument order book.

In more detail, only those synthetic paths $(k_0, \ldots, k_\lambda)$ up to the maximum public path length $\lambda_0$ with $\lambda \leq \lambda_0$ are considered for publication which contain one $k_i$, $i=0, \ldots, \lambda$, with $k_i=0$.

b) Refined Basic Rule for Matching—Allow some pure synthetic spread paths:

In addition to the basic rule 2), matching cycles longer than $\lambda_0+1$ must contain at least one simple instrument order book.

In more detail, only those matching cycles $(l_0, \ldots, l_\mu)$, $l_0=l_\mu$, of length $\lambda_0+1<\mu \leq \mu_0$ are considered which contain one $l_i$, $i=1, \ldots, \mu$, with $l_i=0$ where $\mu_0$ is the maximum matching cycle length. For matching cycles $(l_0, \ldots, l_\mu)$, $l_0=l_\mu$ of length $\mu \leq \lambda_0+1$, no such restriction exists.

c) Refined Basic Rule for Matching—Exclude all pure synthetic spread paths:

In addition to the basic rule 2), all matching cycles considered by the matching engine must contain at least one simple instrument order book.

In detail, only those matching cycles $(l_0, \ldots, l_\mu)$, $l_0=l_\mu$, of length $1 \leq \mu \leq \mu_0$ are considered which contain one $l_i$, $i=1, \ldots, \mu$, with $l_i=0$.

Based on the refined basic ruled a), b) and c), the following synthetic paths are considered independently for publication and for internal matching:

For publication (refined rule a), the set of all allowed public paths denoted by APP is given for:
simple instrument buy orders:
(1) all paths $(0, k_1, \ldots, k_\lambda)$ with $\lambda \leq \lambda_0$;
simple instrument sell orders:
(2) all paths $(k_0, \ldots, k_{\lambda-1}, 0)$ with $\lambda \leq \lambda_0$;
complex instrument buy (sell) orders:
(3) all paths $(k_0, \ldots, k_i, \ldots, k_\lambda)$ with $k_0>k_\lambda$, $(k_0<k_\lambda)$ and $\lambda \leq \lambda_0$ and with $k_i=0$ for one i, $0<i<\lambda$.

For Internal matching which allows some pure synthetic spread paths (refined rule b), the set of all allowed match paths denoted by AMP is given for:
simple instrument buy orders:
(1) all paths $(0, k_1, \ldots, k_\lambda)$ with $\lambda \leq \mu_0-1$;
simple instrument sell orders:
(2) all paths $(k_0, \ldots, k_{\lambda-1}, 0)$ with $\lambda \leq \mu_0-1$;
complex instrument buy (sell) orders:
(3) all paths $(k_0, \ldots, k_i, \ldots, k_\lambda)$ with $k_0>k_\lambda$ $(k_0<k_\lambda)$ and $\lambda \leq \mu_0-1$ and with $k_i=0$ for one i with $0<1<\lambda$,
(4) all paths $(k_0, \ldots, k_i, \ldots, k_\lambda)$ with $k_0>k_\lambda$ $(k_0<k_\lambda)$ and $\lambda \leq \lambda_0$ and with $k_i \neq 0$ for all i, $0 \leq i \leq \lambda$.

Internal matching which excludes all pure synthetic spread paths (refined rule c) Same as for refined rule b) but without bullet (4), i.e. excluding all paths $(k_0, \ldots, k_i, \ldots, k_\lambda)$ with $\lambda \leq \lambda_0$ and with $k_i \neq 0$ for all i, $0 \leq i \leq \lambda$. Consequently, the set of all allowed match paths AMP excluding all pure synthetic spread paths is reduced by bullet (4) compared to the set of all allowed match paths which allows some pure synthetic spread paths.

The maximum public path length $\lambda 0$, the maximum matching cycle length $\mu 0$ and the binary parameter AllowPureSyntheticSpreads (determining whether refined rule b or refined rule c applies) are regarded as fundamental matching configuration parameters which have to be specified by the exchange. Derivative Markets at Eurex may usually be specified by $\lambda 0=2$, $\mu 0=4$ and AllowPureSyntheticSpreads is set to "true".

For instance, provided that $N \geq 3$ and the maximum public path length $\lambda_0$ is set to 2, the refined basic rules a), b) and c) result to the following synthetic paths considered for
Publication (refined rule a) for $\lambda_0=2$:
The set of all allowed public path denoted by APP is given for:
simple instruments buy orders: (0,l) and (0,i,l) with $i \in \{1 \ldots, N | i \neq l\}$,
simple instruments sell orders: (k,0) and (k,j,0) with $j \in \{1, \ldots, N | j \neq k\}$,
complex instruments buy orders: (k,l) and (k,0,l) with, $k>l$
complex instruments sell orders: (k,l) and (k,0,l) with $k<l$.
Internal matching which allows some pure synthetic spread paths (refined rule b) for $\lambda_0=2$:
The set of all allowed match path denoted by AMP is given for:
simple instruments buy orders: (0,l) and (0,m,l) and (0,i,j,l) with $0 \neq m \neq l$ and $0 \neq i \neq j \neq l$,
simple instruments sell orders: (k,0) and (k,n,0) and (k,p,q,0) with $0 \neq n \neq k$ and $0 \neq p \neq q \neq k$
complex instruments buy orders: (k,l), (k,0,l), (k,m,l), (k,0,i,l) and (k,j,0,l), for $k>l$ and with $0 \neq k \neq m \neq l$, $k \neq i \neq l \neq 0$ and $0 \neq k \neq j \neq l$,
complex instruments sell orders: (k,l), (k,0,l), (k,m,l), (k,0,i,l) and (k,j,0,l) for $k<l$ and with $0 \neq k \neq m \neq l$, $k \neq i \neq l$—0 and $0 \neq k \neq j \neq l$.
Internal matching which excludes all pure synthetic spread paths (refined rule c for $\lambda_0=2$):
Same as for refined rule b) for $\lambda_0=2$ but the pure synthetic spread paths (k,m,l) with $0 \neq k \neq m \neq l$ are excluded. Consequently, AMP does not include paths of type (k,m,l) with $0 \neq k \neq m \neq l$.

The distinction between public and match path is required to avoid publication of crossed order books. To be more precise, according to embodiments, to avoid the publication of crossed order book situations, the matching cycles internally considered by the matching engine must be chosen to have a maximum length which is twice as much the maximum public path length.

Assume a path (k0, ..., kλ) of length $\lambda \leq \lambda 0$ in the outright order book side (k0, kλ) and a path (l0, ..., lλ') of length $\lambda' \leq \lambda 0$ in the outright order book side (l0, ..., lλ') which is opposite to the outright order book side (k0, kλ), i.e. k0=lλ' and l0=kλ.

Additionally, assume that both paths $(k0, \ldots, k\lambda)$ and $(l0, \ldots, l\lambda')$ represent the best price available for the outright order book sides $(k0, k\lambda)$ and $(l0, \ldots, l\lambda')$, respectively. As $\lambda \leq \lambda 0$ and $\lambda' \leq \lambda 0$ is assumed, both prices will be published. As the outright order book sides $(k0, k\lambda)$ and $(l0, l\lambda')$ are opposite to each other, the paths $(k0, \ldots, k\lambda)$ and $(l0, \ldots, l\lambda')$ can be composed to generate the closed path $(k0, \ldots, k\lambda, l1, \ldots, l\lambda')$ of length $\lambda + \lambda' \leq 2 * \lambda 0 = \mu 0$.

In case of a crossed order book situation of the outright order book sides $(k0, k\lambda)$ and $(l0, l\lambda')$ resulting from the paths $(k0, \ldots, k\lambda)$ and $(l0, \ldots, l\lambda')$, the path limit of the closed path would be non-negative, i.e. $PL(k0, \ldots, k\lambda, l1, \ldots, l\lambda') \geq 0$, and because of the length $\lambda + \lambda' \leq \mu 0$, the closed path $(k0, \ldots, k\lambda, l1, \ldots, l\lambda')$ represents a matching cycle. However, the existence of a matching cycle in continuous trading implies that there must be an incoming order temporarily generating this matching cycle and, consequently, triggering a matching event.

After the match event has been concluded, the matching cycle $(k0, \ldots, k\lambda, l1, \ldots, l\lambda')$ does not exist anymore, i.e. either $(k0, \ldots, k\lambda)$ or $(l0, \ldots, l\lambda')$ has completely vanished or $PL(k0, \ldots, k\lambda, l1, \ldots, l\lambda') < 0$. In any case, the crossed order book situation is resolved, i.e. the best available prices of outright order book sides $(k0, k\lambda)$ and $(l0, l\lambda')$ resulting after the match event do not cross.

Consequently, only in case of a non-crossed order book situation, the path limit of paths $(k0, \ldots, k\lambda)$ and $(l0, \ldots, l\lambda')$ assumed to represent the best prices available for the opposing outright order book sides $(k0, k\lambda)$ and $(l0, \ldots k\lambda')$ are displayed to the outside world without triggering a matching event.

From a functional point of view, internal matching should be performed by allowing some pure synthetic spread paths because of the following reason:

Assume two synthetic paths $(k,i,j,l)$ and $(k,j,i,l)$. Although both paths use the same outright contracts $k,i,j,l$, they are based on different order book sides. In particular, one path is containing the order book side $(i,j)$ while the other path is containing the opposite order book side $(j,i)$.

It can be shown that if both paths $(k,i,j,l)$ and $(k,j,i,l)$ have the same synthetic price, then either the path $(k,i,l)$ or the path $(k,j,l)$ has a better price preventing that an incoming order $(l,k)^{Inc}$ which is matched simultaneously against the synthetic paths $(k,i,j,l)$ and $(k,j,i,l)$ in the same match event.

Note that in case the bid and the ask side of the same outright contract would be matched in different synthetic paths of the same match event, the bid and the ask side would generate different trade prices one trade price on the bid and one on the ask side in the same contract.

By allowing pure synthetic spread paths, it is ensured that the trade price in every outright contract resulting from a synthetic match is always unique.

Although it is a very special order book situation, it can not be ensured that the trade price on order book level resulting from a synthetic match event is always unique in case of pure synthetic spread paths are excluded.

As a side effect of the restricted synthetic combinations defined by the basic rules 1) and 2) or by the refined basic rules a), b) and c), it is possible that matches occur outside the bid-ask spread for specific market situations provided that $N > 3$.

As an example, assume that the maximum public path length $\lambda_0$ is set to 2 implying a maximum matching cycle length $\mu_0$ identical to 4 and that an outright contract k with a synthetic buy and sell order of length 2 is generating a bid-ask spread which—according to Rule 1)—is displayed as best prices opposing each other in the contract k. Afterwards, assume that a synthetic bid order of length 3 in outright contract k is generated which crosses the ask order of length 2. In accordance with the basic rule (1) and (2), the synthetic order of length 3 is internally calculated but not published. The combination of the synthetic bid order of length 3 and the synthetic ask order of length 2 result to a matching cycle of length 5 which according to basic rule 2) or according to the refined basic rules b) and c) is not considered by the matching engine. Thus, no match occurs although the order book is crossed.

Assume an incoming outright sell order (i.e. a synthetic sell order of length 1) in contract k with a price worse than the synthetic ask order of length 2 but crossing the bid order of length 3. The incoming sell order of length 1 and the synthetic bid order of length 3 generate a matching cycle of length 4 which according to the basic rule 2) or the refined basic rule b) and c) is resolved by matching the incoming sell order against the synthetic bid order of length 3 at the limit of this synthetic bid order. However, the limit of the synthetic buy order of length 3 generating the match price is outside the published bid-ask range of contract k.

For $N \leq 3$, matches outside the bid-ask spread of a synthetically combined contracts are not possible.

As denoted previously, the path limit of a synthetic path is given by $PL(k_0, \ldots, k_\lambda) = \sum_{n=1}^{\lambda} L(k_{n-1}, k_n)$ where $L(k_{i-1}, k_i)$ is the best limit available from the outright order book side $(k_{i-1}, k_i)$, $i=1, \ldots, \lambda$ while the path quantity of a synthetic path is defined by $PQ(k_0, \ldots, k_\lambda) = MIN\{Q(k_{i-1}, k_i) | i=1, \ldots, \lambda\}$ where $Q(k_{i-1}, k_i)$ is the accumulated order book quantity of all price best orders of the order book side $(k_{i-1}, k_i)$. Based on the definitions of allowed public paths and allowed match paths, the definitions of Best Public Limit, Best Public Paths, Best Match Limit and Best Match Paths are introduced.

The Best Public Limit of outright order book side $(g,h)$, $g \neq h$ is defined by $$BPL(g,h) = MAX\{PL(k_0, \ldots, k_\lambda) | (k_0, \ldots, k_\lambda) \in APP(g,h) \text{ with } k_0 = g, k_\lambda = h\}$$

i.e. $BPL(g,h)$ represents the best public limit of the outright order book side $(g,h)$ based on all allowed public paths available for the outright order book side $(g,h)$, i.e. based on $APP(g,h)$.

A path $(k_0, \ldots, k_\lambda)$ with path limit $PL(k_0, \ldots, k_\lambda)$ equal to $BPL(g,h), k_0 = g, k_\lambda = h$ is denoted as a price best public path and included to the set of price best public paths $BPP(g,h) \subseteq APP(g,h)$ of outright order book side $(g,h)$, i.e. a path $(k_0, \ldots, k_\lambda)$ is denoted as price best public path and included to the set of best public paths, i.e. $(k_0, \ldots, k_\lambda) \in BPP(g,h)$, if $PL(k_0, \ldots, k_\lambda) = BPL(g,h)$ for $k_0 = g, k_\lambda = h$.

As noted earlier, the distinction between allowed public paths and allowed match paths is required to prevent crossed order book situations during the continuous trading phase implying that the relation $BPL(g,h) + BPL(h,g) < 0$ is valid for all outright contracts at any time during the continuous trading phase.

The Best Match Limit of outright order book side $(g,h)$, $g \neq h$, is defined by $$BML(g,h) = MAX\{PL(k_0, \ldots, k_\lambda) | (k_0, \ldots, k_\lambda) \in AMP(g,h) \text{ with } k_0 = g, k_\lambda = h\},$$

i.e. $BML(g,h)$ represents the best price of the outright order book side $(g,h)$ based on all allowed match paths available for the outright order book side $(g,h)$, i.e. based on $AMP(g,h)$.

A path $(k_0, \ldots, k_\lambda)$ with path limit $PL(k_0, \ldots, k_\lambda)$ equal to $BML(g,h), k_0=g, k_\lambda=h$ is denoted as a price best match path and included to the set of price best match paths $BMP(g,h) \subseteq AMP(g,h)$ of the outright order book side $(g,h)$, i.e. a path $(k_0, \ldots, k_\lambda)$ is denoted as price best match path and included to the set of best match paths, i.e. $(k_0, \ldots, k_\lambda) \in BMP(g,h)$ if $PL(k_0, \ldots, k_\lambda)=BML(g,h)$ for $k_0=g, k_\lambda=h$, $\lambda \leq \mu_0 - 1$.

In case $BPL(g,h) < BML(g,h)$, all price best match paths $(k_0, \ldots, k_\lambda)$ are of length $\lambda > \lambda_0$ with a path limit better than the published best price. Consequently, the set of price best match paths is completely different from the set of price best public paths, i.e. $BPL(g,h) \neq BMP(,g,h)$.

In case of $BPL(g,h)=BML(g,h)$, the relation $BLP(g,h) \subseteq BMP(g,h)$ holds true.

Note that there might be a crossed order book situation generated by pure price best match paths which is not resolved by the matching algorithm described with regard to FIGS. 3 to 5.

Assume an order book situation with $BPL(g,h)<BML(g,h)$ and $BPL(h,g)<BML(h,g)$. In this case, it is possible that the outright order book sides $(g,h)$ and $(h,g)$ are crossed with respect to the best match limits but there is no crossed order book situation with respect to the best public limits. i.e. $BML(,g,h)+BML(h,g) \geq 0$ but $BPL(g,h)+BPL(h,g)<0$.

A match event (also referred to as matching event) is generated by an incoming order $(h,g)^{inc}$ with limit $L^{inc}(h,g)$ and quantity $Q^{inc}(h,g)$ satisfying the matching condition $L^{inc}(h,g)+BML(g,h) \geq 0$. As a consequence of a match event, there is at least on price best match path $(k_0, \ldots, k_\lambda)$ with $k_0=g, k_\lambda=h$ and $\lambda \leq \mu_0 - 1$ which is executable against the incoming order $(h,g)^{inc}$, i.e. $(h,g)^{inc} \otimes (k_0, \ldots, k_\lambda)$ with $k_0=g, k_\lambda=h, \lambda \leq \mu_0 - 1$ which results to the matching cycle $PL(k_0, \ldots, k_\lambda, k_0) \geq 0$.

Turning now to FIG. 3, a method 300 for matching an incoming outright order during the continuous trading phase is described. The method of FIG. 3 may be applied for maintaining combinations of outright order book sides of a derivative product. At step 310, an incoming order is entered in an outright order book side corresponding to the entered incoming order. The outright order book side where the incoming order has been entered is also referred to as incoming outright order book side. Assume that an order of the outright order book side $(h,g)^{inc}$, $h \neq g$ as been entered with limit $L^{inc}(h,g)$ and quantity $Q^{inc}(h,g)$ at step 310. Additionally, it is verified at step 320 whether the incoming order satisfies the matching condition $L^{inc}(h,g)+BML(g,h) \geq 0$. Assume that the incoming order $L^{inc}(h,g)$ does not satisfy the matching condition and, consequently, does not result to a match against the order book side $(g, h)$ opposing to the incoming side. Thus, the method of FIG. 3 branches to step 340, where it is determined whether the limit of the incoming order is less, equal or greater than the best limit of the incoming order book side $(h,g)^{inc}$.

If it is determined at step 340 that the limit of the incoming order is worse than the best limit of the incoming order book side $(h,g)^{inc}$, i.e. $L^{inc}(h,g)<L(h,g)$, the incoming order is written to the incoming order book side $(h,g)^{inc}$ at step 380.

If it is determined at step 340 that the limit of the incoming order is equal to the best limit of the incoming order book side $(h,g)$ i.e $L^{inc}(h,g)=L(h,g)$, the quantity $Q(h,g)$ available at the best price level of incoming order book side $(h,g)$ is increased by $Q^{inc}(h,g)$ at step 350.

Thereafter, it is verified at step 360 whether the incoming order book side contributes to) the best public or best match paths, i.e. whether $(h,g) \in BPP(h,g)$ or $(h,g) \in BMP(h,g)$. If so, the quantity associated with the best public limit $BPL(h,g)$ or with the best match limit $BML(h,g)$ is recalculated at step 360.

At step 370, it is verified whether the incoming order book side is included in a best public or best match path referring to an outright order book side different from the incoming one, i.e. whether there exists a path $(k_0, \ldots, k_\lambda) \in BPP(k_0, k_\lambda)$ or $(k_0, \ldots, k_\lambda) \in BMP(k_0, k_\lambda)$ of outright order book side $(k_0, k_\lambda) \neq (h,g)$ with $(k_{i-1}, k_i)=(h,g)$ for some $i, 30<i \leq \lambda$. If so, the quantity associated with the best public limit $BPL(k_0, k_\lambda)$ or with the best match limit $BML(k_0, k_\lambda)$ is recalculated at step 370. Note, that there is no change of $BPP(k_0, k_\lambda)$ and $BMP(k_0, k_\lambda)$.

At step 380, the incoming order is written to the incoming order book side $(h,g)^{inc}$.

If it is determined at step 340 that the limit of the incoming order is better than the best limit of the incoming order book side $(h,g)$, i.e. $L^{inc}(h,g)>L(h,g)$, the best price level of the incoming order book side is set to the limit of the incoming order at step 355, i.e. $L(h,g)=L^{inc}(h,g)$ and $Q(h,g)=Q^{inc}(h,g)$.

At step 365, it is verified whether the incoming order book side contributes to the best) public or best match paths before the incoming order was entered, i.e. whether $(h,g) \in BPP(h,g)$ or $(h,g) \in BMP(h,g)$. If so, the best public limit $BPL(h,g)$ or the best match limit $BML(h,g)$ is improved at step 365 by the incoming order implying that $BPL(h,g)=L^{inc}(h,g)$ or $BMP(h,g)=L^{inc}(h,g)$, correspondently, and $BPP(h,g)=\{(h,g)\}$ or $BMP(h,g)=\{(h,g)\}$, correspondently.

At step 375, it is verified whether the incoming order book side is included in a best public or best match path referring to an outright order book side different from the incoming one, i.e. whether there exists a path $(k_0, \ldots, k_\lambda) \in BPP(k_0, k_\lambda)$ or $(k_0, \ldots, k_\lambda) \in BMP(k_0, k_\lambda)$ of outright order book side $(k_0, k_\lambda) \neq (h,g)$ with $(k_{i-1}, k_i)=(h,g)$ for some $i, 0<i \leq \lambda$. If so, the best public limit $BPL(k_0, k_\lambda)$ or the best match limit $BMl(k_0, k_\lambda)$ of outright order book side $(k_0, k_\lambda)$ is improved at step 375 by the incoming order implying that $BPL(k_0, k_\lambda)$ or $BML(k_0, k_\lambda)$, correspondently, needs to be recalculated and that the new price best public paths $BPP(k_0, k_\lambda)$ or the new price best match paths $BMP(k_0, k_\lambda)$, correspondently, must contain the path $(k_0, \ldots, k_\lambda)$. Step 375 also includes whether the improvement of the best price level of the incoming order book side generates new best public paths or new best match paths containing the incoming order book side which results to an outright order book side different from the incoming order book side and which have not been considered before in the list of best public paths or in the list of best match paths.

At step 380, the incoming order is written to incoming order book side $(h,g)^{inc}$.

Please note that in FIG. 3, the steps 360, 365, 370, 375 are additional required to process synthetic paths while steps 350 and 355 are only required when confining to outright order books without any synthetic combinations.

If it is determined at step 320 that the incoming order $(h,g)^{inc}$ satisfies the matching condition, the incoming order is matched against the outright order book side $(g,h)$ opposing the incoming order book side at step 330. According to embodiments of the invention, the matching of the incoming order at step 330 may be performed according to the method described with regard to FIG. 4.

Describing now step 330 in more detail and referring additionally to FIG. 4, in case of a match event, i.e. in case it is determined at step 320 that the matching condition $L^{inc}(h,g)+BML(g,h) \geq 0$ is satisfied, a price best path $(k_0, \ldots, k_\lambda) \in BMP(g,h)$ with $k_0=g$ and $k_\lambda=h$ is considered first for the execution against an incoming order $(h,g)^{inc}$. Specifically, at step 410, all price best match paths of the outright order book side opposing the incoming outright order book side are determined.

If more than one price best paths $(k_0^{(n)}, \ldots, k_{\lambda_n}^{(n)}) \in GMP(g,h)$ on the book side with $n=1, \ldots, \omega$ satisfying the condition $PL(k_0^{(n)}, \ldots, k_{\lambda_n}^{(n)})=BML(g,h)$, $k_0^{(n)}=g, k_{\lambda_n}^{(n)}=h$ $m\lambda_n \leq \mu_0-1$ for each $n=1, \ldots, \omega$, an additional priority denoted by path priority is required to determine which price best path is considered first for the execution against the incoming order $(h,g)^{inc}$. The path priority is subordinated to the price priority. Accordingly, if more than one price best match paths are determined at step 410, the path priority of all price best match paths determined at step 410 is determined based on the path priority valid on product level at step 420.

Specifically, the following rules are applied at step 420 to define a ranking of price best paths.

1) Path ranking of paths having different path length:
The price best paths are ranked by their length, i.e. in case of two price best paths $(k_0^{(1)}, \ldots, k_{\lambda_1}^{(1)})$ and $(k_0^{(2)}, \ldots, k_{\lambda_2}^{(2)})$, with $k_0^{(1)}=k_0^{(2)}$, $k_{\lambda_1}^{(1)} = k_{\lambda_2}^{(2)}$ and length $\lambda_1 < \lambda_2$, the path $(k_0^{(1)}, \ldots, k_{\lambda_1}^{(1)})$ is ranked first compared to path $(k_0^{(2)}, \ldots, k_{\lambda_2}^{(2)})$.

(2) Path ranking of paths having same path length:
In case of two price best paths $(k_0^{(1)}, \ldots, k_{\lambda_1}^{(1)})$ and $(k_0^{(2)}, \ldots, k_{\lambda_2}^{(2)})$ with $k_0^{(2)}=k_0^{(2)}, k_{\lambda_1}^{(1)}=k_{\lambda_2}^{(2)}$ having the same length $\lambda_1=\lambda_2$ but $k_1^{(1)} < k_1^{(2)}$, then the path $(k_0^{(1)}, \ldots, k_{\lambda_1}^{(1)})$ is ranked first compared to path $(k_0^{(2)}, \ldots, k_{\lambda_2}^{(2)})$. In case of $k_i^{(1)}=k_i^{(2)}$ for all $0 < i < i_0 < \lambda_1 = \lambda_2$ and $k_{i_0}^{(1)} < k_{i_0}^{(2)}$ then the path $(k_0^{(1)}, \ldots, k_{\lambda_1}^{(1)})$ is ranked first compared to the path $(k_0^{(2)}, \ldots, k_{\lambda_2}^{(2)})$.

The path ranking defines a unique sequence of best match paths which is included to the list of best match path of outright order book side $(g,h)$ by introducing a sequence of paths consistent with their ranking, i.e.

$$BMP(g,h)=\{(k_0^{(1)}, \ldots, k_{\lambda_1}^{(1)}, \ldots, (k_0^{(\omega)}, \ldots, k_{\lambda_\omega}^{(\omega)}) | k_0^{(1)}=\ldots=k_0^{(\omega)}=g, k_{\lambda_1}^{(1)}=\ldots=k_{\lambda_\omega}^{(\omega)}=h\}$$

where $\omega$ is the number of best match paths available for the outright order book side $(g,h)$. Due to the path ranking, the relation $1 < \lambda_1 < \lambda_2 \leq \ldots \leq \lambda_\omega \leq \mu_0-1$ holds.

Based on the path ranking, the path priority specifies which paths are considered first for the execution against the incoming order $(h,g)^{inc}$ in case of a match event.

In general, the following path priorities are applicable for step 420:

i) Path priority of small length:
Paths of smaller length are preferred over paths of larger length, i.e. the path ranking introduced previously is taken over as path priority.

ii) Path priority of large length:
Paths of larger length are preferred over paths of smaller length, i.e. the path ranking introduced previously is reversed for paths having a length up $\lambda_0$ while the ranking of paths having a length larger than $\lambda_0$ is retained. The path ranking of paths having the same length is retained.

iii) Pro-Rata path priority:
All price best paths with length equal to or shorter than $\lambda'_0 \leq \lambda_0$ are simultaneously considered for the execution against the incoming order $(h,g)^{inc}$. Along that line, a path $(k_0, \ldots, k_\lambda)$ with $\lambda \leq \lambda'_0$ is taken into account by considering its pro-rata quantity weight which is defined as the ratio between the path quantity $PQ(k_0, \ldots, k_\lambda)$ and the accumulated path quantity of all price best paths with length $\lambda \leq \lambda'_0$. Priority of paths of length $\lambda' > \lambda'_0$ is identical to the path ranking.

The path priority has to be specified on derivative product level for all outright contracts $(g,h)$ with $0 \leq g, h \leq N$, $g \neq h$. Thus, the path priority is regarded as a configuration parameter of the synthetic matching algorithm described with regard to FIG. 4, which needs to be determined by the exchange.

The following specific path priorities may be applicable to best match paths on product level for step 420 in case the maximum public path length $\lambda_0$ is set to 2, i.e. $\lambda_0=2$:

i. Path priority rule 1-2-3 (path priority "small length first"):
The path of length 1 (i.e. the outright order book) is preferred first followed by paths of length 2 followed by paths of length 3. In case of two paths having the same length, the priority is identical to the path ranking applied to paths having the same length.

ii. Path priority rule 2-1-3 (path priority "large length first"):
Paths of length 2 are preferred first followed by the path of length 1 (i.e. the outright contract) followed by the paths of length 3. In case of paths having the same length, the priority is identical to the path ranking applied to paths having the same length.

iii. Pro-Rata path priority of length 2:
All price best paths up to a length $\lambda'_0=2$ define a subset of paths considered simultaneously for execution. Paths of lengths 3 are considered separately with lower priority in accordance with the path ranking applied to paths having the same length.
Note: the accumulated quantity of all price best paths up to length $\lambda'_0=2$ for contract $(g,h)$ denoted by Best Match Quantity $BMQ^{(\lambda \leq \lambda'_0)}(g,h)$—is given by $$BMQ^{(\lambda \leq \lambda'_0)}(g,h)=\Sigma_{n=1}^{\overline{\omega}} PQ(k_0^{(n)}, \ldots, k_{\lambda_n}^{(n)})$$

where $\overline{\omega}$ is the number of all price best paths with path length $\lambda_n \leq \lambda'_0=2$. Thus, the pro-rata weight of such a price best path is given by $PQ(k_0, \ldots, k_\lambda)/BMQ^{(\lambda \leq 2)}(g,h)$.

Note: In case of $\lambda'_0 > 2$, the Best Match Quantity $BMQ^{(\lambda \leq \lambda'_0)}$ can not be calculated by summing up the quantity of all price best paths with length $\lambda_n \leq \lambda'_0$ otherwise $BMQ^{(\lambda \leq \lambda'_0)}$ is overestimated.

At step 430, the quantity of the incoming outright order is allocated to the price best paths in the sequence of their path priority. Assume there are several price best paths $(k_0^{(n)}, \ldots, k_{\lambda_n}^{(n)})$, $n=1, \ldots, \omega$, satisfying the condition $$PL(k_0^{(n)}, \ldots, k_{\lambda_n}^{(n)})=BML(g,h), k_0^{(n)}=g, k_{\lambda_n}^{(n)}=h,$$
$$\lambda_n \leq \mu_0-1 \text{ for all } n=1, \ldots \omega.$$

The ordering of the price best paths reflects the price and one of the path priorities introduced before. Please note that the specification of the path priority may be regarded as an additional configuration parameter of the matching algorithm described with regard to FIGS. 3 to 5. The following scenarios may be implemented:

1) Allocation of path quantity with path priority of small or of large length:
In accordance with the price and path priority of small/large length defined before, each path is allocated sequentially by consuming the incoming quantity $Q^{inc}(h,g)$ until either $Q^{inc}(h,g)$ is completely consumed or all paths of the best price level $BML(g,h)$ are completely allocated. The following steps may be performed:
Determine allocated quantity $Q_n^{path}$ of path $(k_0^{(n)}, \ldots, k_{\lambda_n}^{(n)})$ for $n=1, \ldots, \omega$ Definition: Remaining incoming quantity after allocation of path $(k_0^{(n)}, \ldots, k_{\lambda_n}^{(n)})$: $Q_n^{inc}$ (note that $Q_0^{inc} := Q^{inc}(h,g)$).

The following iterative allocation procedure applies starting with n=1:

If $Q_{n-1}^{inc} > PQ(k_0^{(n)}, \ldots, k_{\lambda_n}^{(n)})$, i.e. if there is enough quantity to allocate path $(k_0^{(n)}, \ldots, k_{\lambda_n}^{(n)})$, then $Q_n^{path} = PQ(k_0^{(n)}, \ldots, k_{\lambda_n}^{(n)})$, i.e. the path quantity of $(k_0^{(n)}, \ldots, k_{\lambda_n}^{(n)})$ is completely allocated.

$Q_n^{inc} = Q_{n-1}^{inc} - Q_n^{path}$, i.e. the remaining incoming quantity is reduced by the allocated path quantity.

Remove path $(k_0^{(n)}, \ldots, k_{\lambda_n}^{(n)})$ from BMPL and, if $\lambda_n > 2$, recalculate availability of remaining price best paths since the allocation of path $(k_0^{(n)}, \ldots, k_{\lambda_n}^{(n)})$ might impact the availability of other paths.

Increase n by 1 and restart allocation procedure with increased n else $Q_n^{path} = Q_{n-1}^{inc}$ and $Q_{n+1}^{path} = \ldots = Q_\omega^{path} = 0$, i.e. the path quantity is allocated by the remaining quantity $Q_{n-1}^{inc}$.

$Q_n^{inc} = Q_{n+1}^{inc} = \ldots Q_\omega^{inc} = 0$, i.e. the remaining incoming quantity is completely consumed.

Stop allocation procedure at index with $\tau = n$.

2) Allocation of path quantity with pro-rata path priority:

In accordance with the price and pro-rata path priority defined before, all paths $PQ(k_0^{(n)}, \ldots, k_{\lambda_n}^{(n)})$ of length $\lambda_n \leq 2$ are considered simultaneously for matching while paths of lengths $\lambda_n > 2$ are afterwards considered sequentially according to their rank. The allocated quantity $Q_n^{path}$, $n=1, \ldots, \omega$ and remaining incoming quantity $Q_n^{inc}$, $n=0, \ldots, \omega$ may be defined as before. For the pro-rata path priority, the accumulated quantity $BMQ^{(\lambda \leq 2)}(g,h)$ of all best match paths $PQ(k_0^{(n)}, \ldots, k_{\lambda_n}^{(n)})$ up to length 2 of contract (g, h) is calculated which is given by $$BMQ^{(\lambda \leq 2)}(g,h) = \Sigma_{n=1}^{\overline{\omega}} PQ(k_0^{(n)}, \ldots, k_{\lambda_n}^{(n)})$$

where $\overline{\omega} \leq \omega$ is the number of all best match paths with path length $\lambda_n \leq 2$. The pro-rata weight may be defined by $PQ(k_0^{(n)}, \ldots, k_{\lambda_n}^{(n)}))/BMQ^{(\lambda \leq 2)}(g,h)$ for all $n=1, \ldots, \overline{\omega}$ The following steps may be performed as allocation procedure:

If $Q_0^{inc} < BMQ^{(\lambda \leq 2)}(g,h)$ then $Q_n^{path} = \text{ROUND}(p_n * Q_0^{inc})$ for all $n=1, \ldots, \overline{\omega}$, i.e. all paths with $\lambda \leq 2$ are simultaneously allocated.

Additional adjustments regarding $Q_n^{path}$ required because of rounding effects.

Stop allocation procedure with $\tau = \overline{\omega}$.

else $Q_n^{path} PQ(k_0^{(n)}, \ldots, k_{\lambda_n}^{(n)})$ for all $n=1, \ldots, \overline{\omega} \leq \omega$, i.e. all paths with $\lambda \leq 2$ are completely allocated.

$Q_{\overline{\omega}}^{inc} = BMQ^{(\lambda \leq 2)}(g,h)$, i.e. remaining incoming quantity is calculated.

Continue to allocate remaining incoming quantity $Q_{\overline{\omega}}^{inc}$ to remaining paths $(k_0^{(n)}, \ldots, k_{\lambda_n}^{(n)})$, $n=\overline{\omega}+1, \ldots, \omega$ with $\lambda_n > 2$ in the sequence reflecting the path ranking.

At step 440, the allocated price best paths are decomposed into their generating order book sides. Further, the allocated quantity of the same generating order book sides involved in different price best paths are accumulated.

Specifically, allocated paths with allocated path quantity $Q_n^{path}$ are decomposed into their generating outright order book sides, i.e.

$$(k_0^{(n)}, \ldots, k_{\lambda_n}^{(n)}) = (k_0^{(n)}, k_1^{(n)}) \oplus (k_1^{(n)}, k_2^{(n)}) \oplus \ldots \oplus (k_{\lambda_n-1}^{(n)}, k_{\lambda_n}^{(n)})$$

for each $n=1, \ldots, \tau$

Accordingly, if the generating outright order book side $(k_\alpha, k_\beta)$ is contained in m different allocated paths $$(k_0^{(n_1)}, \ldots, k_{\lambda_{n_1}}^{(n_1)}), \ldots, (k_0^{(n_m)}, \ldots, k_{\lambda_{n_m}}^{(n_m)})$$

indexed by $n_1, \ldots, n_m$, then the allocated order quantity $Q^{alloc}(k_\alpha, k_\beta)$ of the generating outright order book side) $k_\alpha, k_\beta$) is given by $Q_{alloc}(k_\alpha, k_\beta) = Q_{n_1}^{path} + Q_{n_2}^{path} + \ldots + Q_{n_m}^{path}$.

After all, there are $\gamma$ different generating outright order book sides $(k_{\alpha_1}, k_{\beta_1}), \ldots, (k_{\alpha_\gamma}, k_{\beta_\gamma})$ with allocated generated order book side quantities $Q^{alloc}(k_{\alpha_1}, k_{\beta_1}), \ldots, Q^{alloc}(k_{\alpha_\gamma}, k_{\beta_\gamma})$ which result from the decomposition of $\tau$ allocated paths $(k_0^{(1)}, \ldots, k_{\lambda_1}^{(1)}), \ldots, (k_0^{(\tau)}, \ldots, k_{\lambda_\tau}^{(\tau)})$.

At step 450, individual order allocation in all generating order book sides is performed. Any order allocation scheme may be used for step 450. Further, in embodiments, different order allocation schemes may be used for different generating order book sides. According to some embodiments order allocation schemes as described with regard to FIG. 5 may be used.

Specifically, the individual order allocation of price best orders contained in the generating order book side $(k_{\alpha i}, k_{\beta i})$ with $i=1, \ldots, \gamma$ is performed at step 450. The overall quantity which needs to be allocated to the price best orders is given by the allocated accumulated order quantity $Q^{alloc}(k_{\alpha i}, k_{\beta i})$ and each allocated order is matched at limit $L(k_{\alpha i}, k_{\beta i})$. Note that the generating order book side $(k_{\alpha i}, k_{\beta i})$ contains the accumulated quantity $Q(k_{\alpha i}, k_{\beta i})$ of all price best orders which is equal to or larger than the allocated order book side quantity, $Q^{alloc}(k_{\alpha i}, k_{\beta i})$, i.e.

$Q^{alloc}(k_{\alpha i}, k_{\beta i}) \leq Q(k_{\alpha i}, k_{\beta i})$ for all $i=1, \ldots, \gamma$.

In case of $Q^{alloc}(k_{\alpha i}, k_{\beta i}) < Q(k_{\alpha i}, k_{\beta i})$, an order allocation scheme is required to determine which individual price best orders of the order book side $(k_{\alpha i}, k_{\beta i})$ are matched.

In case of $Q^{alloc}(k_{\alpha i}, k_{\beta i}) = Q(k_{\alpha i}, k_{\beta i})$ all price best orders of the generating order book side $(k_{\alpha i}, k_{\beta i})$ are completely matched and the best price level $L(k_{\alpha i}, k_{\beta i})$ vanishes implying that it is not required to apply an order allocation scheme.

It is possible to specific different order allocation scheme for different outright order books. The following types of order allocation schemes may be considered:

Time allocation

Pure Pro-rata allocation

Time-pro-rata allocation for a specific time sensitivity parameter value

Additional order allocation schemes can be easily integrated to the synthetic matching algorithm.

At step 460, the best public and best match limit including best public paths and best match paths of outright order book side opposing the incoming outright order book side are updated.

Specifically, the equation $Q^{inc}_{mtch} = \Sigma_{n=1}^{\tau} Q_n^{path} \leq q^{inc}$ holds where $\tau$ is the maximum number of allocated paths with $\tau \leq \omega$ and $Q^{inc}_{mtch}$ denotes the matched quantity of the incoming outright order associated with the price level $BML(g,h)$ of the order book side opposing the incoming order book side.

Steps 410 to 460 may be also referred to as synthetic matching.

After the path allocation is concluded at price level BML(g,h), it is determined at step 470 whether there is still a quantity of the incoming order available.

If it is determined at 470 that the incoming order (h,g) is completely matched, then the method branches to 490 where no order book update of incoming order book side is required.

If it is determined at 470 that the incoming order $(h,g)^{inc}$ is not completely matched but all paths $(k_0^{(n)}, \ldots, k_{\lambda_n}^{(n)})$, $n=1, \ldots, \omega$, with $\tau=\omega$ of the price level BML(h,g) are completely allocated, then the price level BMP(g,h) vanishes. In this case, at step 480, the remaining incoming order with remaining quantity $Q^{inc}-Q^{inc}_{mtch}$:

a) either continues to match at a lower price level in case the matching condition is still satisfied for the lower price level BMP'(g,h) of the updated order book side (g,h) opposing the incoming order book side, i.e. $L^{inc}(h,g)+BMP'(g,h) \geq 0$.

b) or, in case the matching condition is not satisfied for the lower price level BMP'(g,h) of the updated order book side (g,h) opposing the incoming order book side, the steps 355 in FIG. 3-1, 365 in FIGS. 3-2 and 375 in FIG. 3-2 are performed in order to verify whether it is required to update the best public limit BPL(h,g) or the best match limit BML(h,g) of the incoming order book side $(h,g)^{inc}$ or whether it is required to update the best public limit or best match limit of order book sides different from the incoming order book side $(h,g)^{inc}$ but which contain the incoming order book side as generating order book side.

The method may then return to step 310 of FIG. 3.

Note that the order allocation scheme is completely separated from the path allocation. The path allocation which is based on the path priority may be regarded as a selection criterion of generating outright order book sides provided in a synthetic context. On the other hand, the order allocation scheme may be regarded as a selection criterion of individual orders stored on the best price level of a specific outright order book side which is completely independent from the synthetic context. The aforementioned allocation schemes can be seen as an example which order allocations may be supported. With the introduction of the configuration parameters regarding path priority and order allocation scheme, it is possible to realize a highly flexible synthetic matching algorithm.

In the following, a discussion of the trade view and traded volume is given.

The allocated order quantity $Q^{alloc}(k_{\alpha i}, k_{\beta i})$, $i=1, \ldots, \gamma$, is referring to the generating order book side $(k_{\alpha i}, k_{\beta i})$ and does not represent the traded quantity (traded volume) commonly used in clearing and positioning. In clearing and positioning, only single leg outright contracts have to be considered with balanced buy and sell sides representing a trade (trade view). Double leg outright contracts need to be decomposed. Thus, in the trade view, the allocated order quantity $Q^{alloc}(k_{\alpha i}, k_{\beta i})$ of the generating order book side $(k_{\alpha i}, k_{\beta i})$ need to be considered by the buy side of contract $k_{\beta i}$ and by the sell side of contract $k_{\alpha i}$.

For a single leg buy order book (i.e. $k_{\alpha i}=0$, $k_{\beta i} \neq 0$), $Q^{alloc}(k_{\alpha i}, k_{\beta i})$ is considered by the buy side of contract $k_{\beta i}$. For a single leg sell order book (i.e. $k_{\alpha i} \neq 0, k_{\beta i}=0$), $Q^{alloc}(k_{\alpha i}, k_{\beta i})$ is considered by the sell side of contract $k_{\alpha i}$. For a spread order book side (i.e. $0 \neq k_{\alpha i} \neq k_{\beta i}$), $Q^{alloc}(k_{\alpha i}, k_{\beta i})$ is considered by the buy side of contract $k_{\beta i}$ and by the sell side of contract $k_{\alpha i}$ resulting to a decomposition of the spread order book in the trade view.

Assume an incoming order $(h,g)^{inc}$ with matched quantity $Q^{inc}_{mtch}(g,h)$ triggers a match event which results to allocated order quantities $Q^{alloc}(k_{\alpha i}, k_{\beta i})$ fit of generating order book sides $(k_{\alpha i}, k_{\beta i})$, $i=1, \ldots, \gamma$. In addition assume that the single leg contracts and the decomposition of the double leg contracts results into single leg contracts $l_1, \ldots, l_\sigma$ satisfying the relation $0 < l_1 < \ldots < l_\sigma \leq N$ with $\sigma \leq N$ where N represents the number of single leg outright contracts involved in the synthetic matching.

In case of an incoming buy order, there is $h=0$ and $g=l_n$ for an index n with $1 \leq n \leq N$.

In case of an incoming sell order, there is $h=l_m$ for an index m with $1 \leq m \leq N$ and $g=0$.

In case of an incoming spread order, there is $h=l_m$, for an index m and $g=l_n$ for an index n with $1 \leq m \leq N$ and $1 \leq n \leq N$. Note that in case of $h=l_m > l_n = g$, the incoming spread order is a buy order and in case of $h=l_m < l_n = g$ the incoming spread order is a sell order.

In the trade view, the traded volume $Q^{trade}(l_i)$ of contract $l_i$, $i=1, \ldots, \sigma$ represents the accumulation of allocated quantity on single leg contract level $l_i$ after the decomposition of double leg outright contracts has been performed. In case of $l_i \neq h$ and $l_i \neq g$, $Q^{trade}(l_i)$ is given by $$Q^{trade}(l_i) = Q^{alloc}(0, l_i) + \sum_{j=1, j \neq 1}^{\sigma} Q^{alloc}(l_j, l_i) \quad \text{(buy side)}$$

$$= Q^{alloc}(l_i, 0) + \sum_{j=1, j \neq i}^{\sigma} Q^{alloc}(l_i, l_j) \quad \text{(sell side)}$$

where the expression in the first line summarizes the buy order book side contributions while the expression in the last line is identical to the sell order book side contributions of allocated quantities. Note that in the trade view, the buy side quantity must be identical to the sell side quantity.

The total traded volume is given by the table below for each single leg outright contract $l_i$, $i=1, \ldots, \sigma$. In case of $h=0$ or $g=0$ (i.e. in case of an incoming single leg outright order), the line with $h=0$ or $g=0$ is cancelled. Finally, the accumulated traded volume of a synthetic match event is given by $\sum_{j=1}^{\sigma} Q^{trade}(l_j)$.

| Contract | Long | Short | $Q^{trade}$ |
| --- | --- | --- | --- |
| $l_1$ | $Q^{alloc}(0, l_1) +$ $\sum_{j=2}^{\sigma} Q^{alloc}(l_j, l_1)$ | $Q^{alloc}(l_1, 0) +$ $\sum_{j=2}^{\sigma} Q^{alloc}(l_1, l_j)$ | $Q^{trade}(l_1)$ |
| . | . | . | . |
| . | . | . | . |
| $h = l_m$ | $Q^{alloc}(0, l_m) +$ $\sum_{j=1, j \neq m}^{\sigma} Q^{alloc}(l_j, l_m)$ | $Q^{inc}_{mtch}(h, g)$ | $Q^{trade}(l_m)$ |
| . | . | . | . |
| $g = l_n$ | $Q^{inc}_{mtch}(h, g)$ | $Q^{alloc}(l_n, 0) +$ $\sum_{j=1, j \neq n}^{\sigma} Q^{alloc}(l_n, l_j)$ | $Q^{trade}(l_n)$ |
| . | . | . | . |
| $l_\sigma$ | $Q^{alloc}(0, l_\sigma) +$ $\sum_{j=1}^{\sigma-1} Q^{alloc}(l_j, l_\sigma)$ | $Q^{alloc}(l_\sigma, 0) +$ $\sum_{j=1}^{\sigma-1} Q^{alloc}(l_\sigma, l_j)$ | $Q^{trade}(l_\sigma)$ |

A synthetic match event of an incoming single leg order is now described as an illustrative example. It is assumed that an incoming order $(2,0)^{inc}$ (i.e. a sell order of single leg contract 2) with quantity $Q^{inc}(2,0)=190$ can be matched against the buy order book side of single leg contract 2.

Path View

It is assumed that the buy order book side contains the following price best paths which are allocated as indicated in accordance with the path priority of small length first.

| Path Rank n | Path $(k_0^{(n)}, \ldots, k_{\lambda_n}^{(n)})$ | Path Length $\lambda_n$ | Path Qty $PQ(k_0^{(n)}, \ldots, k_{\lambda_n}^{(n)})$ | Priority | Allocated Path Qty $Q_n^{path}$ |
|---|---|---|---|---|---|
| 1 | (0, 2) | 1 | 60 | 1 | 60 |
| 2 | (0, 1, 2) | 2 | 50 | 2 | 50 |
| 3 | (0, 3, 2) | 2 | 40 | 3 | 40 |
| 4 | (0, 1, 3, 2) | 3 | 30 | 4 | 30 |
| 5 | (0, 4, 1, 2) | 3 | 20 | 5 | 10 |
| 6 | (0, 5, 1, 2) | 3 | 10 | 6 | 0 |

It is assumed that there are $\omega=6$ paths satisfying the matching condition but only $\tau=5$ paths are allocated resulting to a complete match of the incoming order $(2,0)^{inc}$ with $Q^{inc}_{mtch}(2,0)=Q^{inc}(2,0)=190$ in the incoming order book side (2,0) inc.

Order Book Side View

The decomposition of allocated paths results to the following order book side allocation with $\gamma=8$ different generating order book sides:

| i | $(k_{\alpha i}, k_{\beta i})$ | $Q^{alloc}(k_{\alpha i}, k_{\beta i})$ |
|---|---|---|
| 1 | (0, 1) | $80 = 50 + 30 = Q_2^{path} + Q_4^{path}$ |
| 2 | (0, 2) | $60 = Q_1^{path}$ |
| 3 | (0, 3) | $40 = Q_3^{path}$ |
| 4 | (0, 4) | $10 = Q_5^{path}$ |
| 5 | (1, 2) | $60 = 50 + 10 = Q_2^{path} + Q_5^{path}$ |
| 6 | (1, 3) | $30 = Q_4^{path}$ |
| 7 | (3, 2) | $70 = 40 + 30 = Q_3^{path} + Q_4^{path}$ |
| 8 | (4, 1) | $10 = Q_5^{path}$ |

Trade View

The single leg contracts $l_j$ with $j=1, \ldots, \sigma=1, \ldots, \sigma, \sigma=4$, and their corresponding traded volume resulting from the assumed synthetic match event are given as follows:

| Contract | Buy Side Quantity Contributions | Sell Side Quantity Contributions | $Q^{trade}(l_j)$ |
|---|---|---|---|
| $l_1 = 1$ | $Q^{alloc}(0, 1) + Q^{alloc}(4, 1) = 80 + 10$ | $Q^{alloc}(1, 2) + Q^{alloc}(1, 3) = 60 + 30$ | 90 |
| $l_2 = 2$ | $Q^{alloc}(0, 2) + Q^{alloc}(1, 2) + Q^{alloc}(3, 2) = 60 + 60 + 70$ | $Q^{inc}_{mtch} = 190$ | 190 |
| $l_3 = 3$ | $Q^{alloc}(0, 3) + Q^{alloc}(1, 3) = 40 + 30$ | $Q^{alloc}(3, 2) = 70$ | 70 |
| $l_4 = 4$ | $Q^{alloc}(0, 4) = 10$ | $Q^{alloc}(4, 1) = 10$ | 10 |

Thus, the assumed match event results to a accumulated traded volume of $\tau_{j=1}^4 Q^{trade}(l_j)=360$ lots although the quantity of the incoming order which has been matched completely is given by $Q^{inc}_{mtch}=190$ Turning now to FIG. 5, an order allocation scheme applied during continuous trading specifies the matched proportion of a plurality of price best book order. The matched proportion is also denoted as the quantity to be allocated at the best price level of an order book. The restriction to price best book orders implies that the price priority is always applied first before an allocation scheme determines which price best orders are considered by the matching algorithm.

As an additional aspect, the quantity to be allocated may also refer to the auction price level in case the order allocation scheme is applied during an auction phase to indicate the potential auction price or to determine the final auction price when concluding the auction call phase. Thus, more general, the quantity to be allocated by an order allocation scheme is referring to orders belonging to one price level, and the accumulated quantity of all orders belonging to that price level is larger than the quantity to be allocated. To this effect, the order allocation scheme provides rules to distribute the quantity to be allocated to the orders belonging to one price level which is not necessarily the best price level of an order book side.

FIG. 5 illustrates a generalized allocation scheme. Specifically, FIG. 5 illustrates a flow chart of a method for allocating quantities of price best orders stored in an outright order book. The method described by FIG. 5 may be used in a synthetic matching algorithm to allocated price best orders of an outright order book side $(k_{\alpha i}, k_{\beta i})$, $i=1, \ldots, \gamma$, involved in a synthetic matching event. In this case the quantity to be allocated by the allocation scheme is given by $Q^{alloc}(k_{\alpha i}, k_{\beta i})$, $i=1, \ldots, \gamma$, and the method of FIG. 5 may be used according to some embodiments for step 450 of FIG. 4 as outlined above. In case of a direct match event, where the incoming order is exclusively matched against the order book side opposite to the incoming order and there are no other order book sides involved, the quantity to be allocated by the allocation scheme is identical to the quantity of the incoming order. Thus, the generalized order allocation scheme can also be applied to direct match events.

The method of FIG. 5 illustrates a generalized allocation scheme which is based on a parameterization regarding the impact of the order entry time on the order allocation. In that way, a time sensitivity parameter controls the preference of the first entered orders over the last entered orders and it turns out that the pure pro-rata allocation, the time pro-rata allocation and the time allocation schemes are characterized by specific time sensitivity parameter values. In case the time sensitivity parameter is chosen to be zero meaning that the order entry time has no impact on the order allocation, the generalized allocation scheme is identical to the pro-rata allocation where all price best orders are considered with respect to their order size. In case the time sensitivity parameter is tending to infinity meaning a maximum impact of the order entry time on the allocation, the generalized allocation scheme is identical to the time allocation where the order with the oldest order entry time is allocated first before the order with the second oldest order is allocated next. In case the time sensitivity parameter is chosen to be a finite real number greater than zero, the generalized allocation scheme results to a time-pro-rata allocation where aspects of the pro-rata allocation and of the time allocation are combined. Thus, based on the time sensitivity parameter, there is a unique characterization of the pure pro-rata and time allocation but there are infinite many possibilities to create specific time-pro-rata allocations which are delimited by the pro-rata allocation on the one hand and by the time allocation on the other hand in case the time sensitivity parameter assumes the extreme values zero and infinity.

It is required to define a time sensitivity parameter when applying the generalized order allocation scheme. In derivative markets, as an example, a different time sensitivity parameter could be used for the allocation of single leg outright contracts on the one hand and for double leg outright contracts on the other hand. Thus, a mapping between specific time sensitivity parameter values on the one hand and outright contracts as tradable objects on the other hand has to be defined by the exchange.

Referring to FIG. 5, the quantity to be allocated in a specific outright order book side for any tradable object is received at step 510. At step 520, all price best book orders taking part in the allocation are determined. Based on the time sensitivity parameter valid for the specific outright contract, it is decided at step 530 which allocation scheme is applied. In case a pure pro-rata, time-pro-rata or time allocation scheme has been specified by the exchange, step 540 or 550 or 560 is performed, respectively. Steps 530, 540, 550 and 560 represent the order allocation.

Although all three different allocations are covered by the same generalized order allocation scheme, a separate implementation may be primarily done for performance reasons. In particular the time allocation needs to be implemented separately since a parameter value tending to infinity is difficult to be handled by a computer. Step 540, 550 and 560 are based on a two-step allocation approach, the first step of the two-step approach may be regarded as an ideal allocation resulting to an ideally matched quantity which can assume any non-negative real number because it allocates the quantity of individual price best orders in accordance with a general formula. However, to conclude the first allocation step, the ideally matched quantities of all allocated orders are rounded down to the next nearest integer value resulting to the approximated ideal quantity of an individually allocated order. In a second allocation step, the remaining quantity which was not distributed in the first step because of the round down effect needs to be distributed one lot by one lot to some orders which did not receive a complete quantity allocation during the first allocation step.

It is assumed that the quantity to be allocated denoted by $Q^{tba}$ is allocated against n orders stored in an order book side at a price level selected for execution where n>0 is an arbitrary natural number.

The quantities of the n price best orders stored in the order book before the allocation starts are given by $q_i$ with $i=1, \ldots, n$. Unless stated otherwise, the n price best orders are sequenced by their order entry time, i.e. the oldest order is ranked first (i=1) and the youngest order is ranked last (i=n). The total accumulated quantity of all price best orders is denoted by $$TQ = \sum_{k=1}^{n} q_k$$

and the matched quantity of the order i resulting from the allocation procedure is denoted by $q_i^{match}$ with $i=1, \ldots, n$.

Without loss of generality, it is assumed that the relation $Q^{tba} \leq TQ$ holds which implies that the incoming order is completely matched and not written to the order book. Thus, as a result of the allocation process, the quantity to be allocated $Q^{tba}$ is completely distributed against the book orders, i.e. the equation $$\sum_{k=1}^{n} q_k^{match} = Q^{tba}$$

is valid after the allocation procedure was concluded successfully.

In addition, the quantity variables $\tilde{q}_i^{match(1)}$, $q_i^{match(1)}$ and $q_i^{match(2)}$ are introduced for all $i=1, \ldots, n$ representing the ideally matched quantity ($\tilde{q}_i^{match(1)}$) and the approximated ideally matched quantity ($q_i^{match(1)}$) calculated during the first allocation step and the remaining matched quantity ($q_i^{match(2)}$) determined during the second allocation step. Note that the matched quantity $q_i^{match}$ is finally given by the equation $q_i^{match} = q_i^{match(1)} + q_i^{match(2)}$ for all $i=1, \ldots, n$.

First Allocation Step: Calculation of Approximated Ideally Matched Quantity

Based on the terminology defined above, the generalized allocation scheme applied to step 540, 550 and 560 is given by the formula $$\tilde{q}_i^{match(1)} = \operatorname{MIN}\left\{q_i; \left(\left(Q^{tba} - \sum_{k=1}^{i-1} \tilde{q}_k^{match(1)}\right) \times \left(1 - \left[1 - \frac{q_i}{TQ - \sum_{k=1}^{i-1} q_k}\right]^{s+1}\right)\right)\right\}$$

Equation (1)

where $s \geq 0$ is a real number and denotes the time sensitivity parameter of the generalized allocation scheme. Please note that the ideally matched quantity $\tilde{q}_i^{match(1)}$ is a non-negative real number.

The first allocation step is concluded by determining the approximated ideally matched quantity $q_i^{match(1)}$ which is calculated by rounding down the ideally matched quantity $\tilde{q}_i^{match(1)}$ to the next nearest integer value, i.e.

$q_i^{match(1)} = \operatorname{ROUNDDOWN}(\tilde{q}_i^{match(1)})$
for all $i=1, \ldots, n$ (Equation 2)

Note that

Equation (1) is based on the actual quantity available for matching given by $(Q^{tba} - \sum_{k=1}^{i-1} \tilde{q}_k^{match(1)})$ and the actual quantity available in the order book after i-1 orders have been allocated expressed by $$\left(TQ - \sum_{k=1}^{i-1} q_k\right).$$

Then, apart from $q_i$, only the quantities $(Q^{tba} - \sum_{k=1}^{i-1} \tilde{q}_k^{match(1)}$ and $$\left(TQ - \sum_{k=1}^{i-1} q_k\right)$$

are used for the calculation of the ideally matched quantity $\tilde{q}_i^{match(1)}$ of order i.

Equation (1) represents a recursive formula, i.e. to calculate the ideally matched quantity $\tilde{q}_i^{match(1)}$ of the book order i, the ideally matched quantities $\tilde{q}_1^{match(1)}, \ldots, \tilde{q}_{i-1}^{match(1)}$ of the previous book orders $1, \ldots, i-1$ have to be calculated first. However, this type of formula can be quite efficiently implemented in an electronic trading system.

Equation (1) is invariant against splitting of book orders. Assume that the book order k with quantity $q_k$ and ideally matched quantity $\tilde{q}_k^{match(1)}$ for some $k \in \{1, \ldots, n\}$ is split into m orders with quantity $q_{k1}, \ldots, q_{km}$ satisfying the condition $q_k = \sum_{j=1}^m q_{k_j}$; than Equation (1) results for this new order book situation to the same ideally matched quantities $\tilde{q}_i^{match(1)}$ for all unchanged orders $i \in \{1, \ldots n | i \neq k\}$, and the sum of the ideally matched quantities of all orders $\tilde{q}_{k_1}^{match(1)}, \ldots, \tilde{q}_{k_m}^{match(1)}$ generated by the split is identical to the ideally matched quantity $\tilde{q}_k^{match(1)}$ of order k before the split, i.e. the equation $\tilde{q}_k^{match(1)} = \sum_{j=1}^m \tilde{q}_{k_j}^{match(1)}$ holds.

Second Allocation Step: Distribution of Remaining Quantity

The remaining quantity which needs to be distributed after the first allocation step has been concluded is given by $$Q^{rem} = Q^{tba} - \sum_{k=1}^n q_k^{match(1)} \quad \text{Equation (3)}$$

Please note that the relation $0 \leq Q^{rem} < n$ holds.

One lot by one lot, the remaining quantity $Q^{rem}$ needs to be distributed to those book orders which have not been completely allocated during the first allocation step. These book orders are denoted by "remaining book orders", i.e. for remaining book orders, the relation $0 \leq q_j^{match(1)} < q_j$ holds with $j = 1, \ldots, m$ where $m < n$ represents the maximum number of remaining book orders. Note that book orders which did not receive any quantity during the first allocation step, i.e. book orders with $\tilde{q}_i^{match(1)} < 1$ or $q_i^{match(1)} = 0$, are also considered in the second allocation step.

To distribute the remaining quantity $Q^{rem}$, the following approach may be applied. The remaining book orders are re-sorted by their original order quantity q, whereby the book order with the largest quantity is ranked first, i.e. the relation $q_1 \geq q_2 \geq \ldots \geq q_m$ holds. In case there are more than one remaining book orders having the same original quantity, the remaining book order with the oldest order entry time is rank first. The remaining quantity $Q^{rem}$ is now distributed one lot by one lot in accordance with the ranking of the remaining book orders starting with the remaining book order ranked first. The remaining quantity distribution ends when $Q^{rem}$ is completely consumed. Thus, we have $q_j^{match(2)} 1$ for all $j = 1, \ldots, m_0$ and $q_j^{match(2)} = 0$ for all $j = m_0 1, \ldots, m$     Equation (4)

with $m_0 = Q^{rem}$.

As mentioned earlier, the matched quantity of order i is finally given by $q_i^{match} = q_i^{match(1)} + q_i^{match(2)}$ which concludes the overall order allocation.

Note that there are other procedures available to distribute the remaining quantity $Q^{rem}$. For example, the remaining book orders can be re-sorted by their difference between the ideally matched quantity and the approximately ideally matched quantity, i.e. by $\tilde{q}_i^{match(1)} - q_i^{match(1)}$, and the distribution of the remaining is performed one lot by one lot starting with the largest difference $\tilde{q}_i^{match(1)} - q_i^{match(1)}$. However, the re-sorting by original order size is chosen for second step allocation step because it ensures that order splitting does not provide any benefit. Depending on the order book situation, order book splitting rather results to a disadvantage for the entering trader since he will receive less matched quantity for all his split orders compared to one order with undivided quantity.

To avoid the two-step allocation approach, the following one-step allocation approach may be used alternatively to perform the order allocation in step 540, 550 and 560.

$$q_i^{match} = \text{MIN}\left\{q_i; \text{ROUND}\left\{\left(Q^{tba} - \sum_{k=1}^{i-1} q_k^{match}\right) \times \left(1 - \left[1 - \frac{q_i}{\left(TQ - \sum_{k=1}^{i-1} q_k\right)}\right]^{s+1}\right)\right\}\right\} \quad \text{Equation (5)}$$

The ROUND-function applied in Equation (5) results to a round-up in case the decimals are equal to or larger than 0.5 and to a round-down in case the decimals are smaller than 0.5. Thus, depending on the order book situation, the ROUND-function in Equation (5) may result to a round-up or a round-down to the nearest integer quantity value when calculating the matched quantity of book order i.

However, since an "excess" of decimals of the book order i is passed to the next book order i+1, the ROUND-function of Equation (5) causes a slight systematic disadvantage for book orders ranked at the top and a slight advantage for book orders ranked at the bottom.

The one-step allocation approach described by equation (5) may result to a reduced calculation time compared to the two-step allocation approach, while Equation (1) and Equation (4) representing the two-step allocation approach result to a more balanced distribution of the remaining quantity compared to Equation (5).

In the following, the impact of the time sensitivity parameter will be discussed based on equation (5) representing the one-step allocation approach. However, there is no difference with respect to the time sensitivity between the one-step and two-step allocation approach defined by Equation (1) and Equation (4). Therefore, all arguments and conclusions valid for the one-step approach also holds for the two-step approach without restrictions.

To illustrate the effect of the time sensitivity parameter s, the generalized allocation scheme given by Equation (5) is discussed for the following three values of s. Case (I): $S = 0$ (Pure Pro-Rata Allocation)

By setting $S = 0$, Equation (5) is transformed to the following formula.

$$q_i^{match} = \text{MIN}\left\{q_i; \text{ROUND}\left\{\left(Q^{tba} - \sum_{k=1}^{i-1} q_k^{match}\right) \times \frac{q_i}{\left(TQ - \sum_{k=1}^{i-1} q_k\right)}\right\}\right\} \quad \text{Equation (6)}$$

Equation (6) represents a pure pro-rata allocation scheme.

Case (II): $S = 1$ (Time-Pro-Rata Allocation)

By setting $s = 1$, the following formula is derived from Equation (5).

$$q_i^{match} = \text{MIN}\left\{q_i; \text{ROUND}\left\{\left(Q^{tba} - \sum_{k=1}^{i-1} q_k^{match}\right) \times \left(1 - \left[1 - \frac{q_i}{TQ - \sum_{k=1}^{i-1} q_k}\right]^2\right)\right\}\right\}$$ Equation (7a)

or $$q_i^{match} = \text{MIN}\left\{q_i; \text{ROUND}\left\{\left(Q^{tba} - \sum_{k=1}^{i-1} q_k^{match}\right) \times \left(\frac{\left(TQ - \sum_{k=1}^{i-1} q_k\right)^2 - \left(TQ - \sum_{k=1}^{i-1} q_k - q_i\right)^2}{\left(TQ - \sum_{k=1}^{i-1} q_k\right)}\right)\right\}\right\}$$ Eqn (7b)

Equation (7) may be regarded as an improvement over conventional time pro-rata allocation since by considering the actual quantity available for matching and the actual quantity available in the order book, it results to a smoother order allocation.

Equation (7) which includes a fixed time sensitivity parameter of s=1 may be replaced by Equation (1) and Equation (4) with a variable time sensitivity parameter enabling to cover a wide range of different time-pro-rata allocation schemes. The time sensitivity parameter can be introduced as an additional market model parameter to allow the specification of different allocation schemes on instrument (or outright contract) level.

Case (III): s→∞ (Time Allocation)

In case of s→∞, Equation (4) is reduced to the formula given below.

$$q_i^{match} = \text{MIN}\left\{q_i; \left(Q^{tba} - \sum_{k=1}^{i-1} q_k^{match}\right)\right\}$$ Equation (8)

Equation (8) represents the time priority, i.e. the first order is filled as much as possible and the remaining quantity is passed to the next order. Note that decimals do not occur since only whole numbers are involved in Equation (8). Thus, a second allocation step of a two-step approach is not required in case of s→∞ and Equation (8) could also be derived from Equation (1).

For illustrative purposes, the following order book situation is assumed. There are ten price best book orders resting in the order book, i.e. n=10. The quantity $q_i$ of each book order i=1, ..., 10 is set to 100, i.e. $q_i$=100 for i=1, ..., 10 resulting to a total accumulated quantity of TQ=1000. The quantity to be allocated is assumed to be $Q^{tba}$=100.

The matched quantities $q_i^{match}(s)$ may be exclusively based on the one-step allocation approach described by Equation (5). Since the difference between the one-step and the two-step allocation approach is small with respect to the order book situation introduced before, all conclusions which are drawn with respect to the matched quantities $q_i^{match}(s)$ are also valid for the two-step approach. Thus, no distinction is made between $q_i^{match}(s)$ as a result of equation (5) and $q_i^{match}(s)$ as a result of the equations (1) and (4).

For the pure pro-rata allocation (see Case (I) with s=0 above), the aforementioned order scenario results to a matched quantity of 10 for each book order, i.e.

$q_i^{match}$=10 for i=1, ..., 10.

For the allocation based on time priority (see Case (III) with s→∞ above), the order ranked first receives all of the quantity to be allocated $Q^{tba}$, i.e.

$q_1^{match}$=100 and $q_i^{match}$=0 for i=2, ..., 10.

Figure 6:
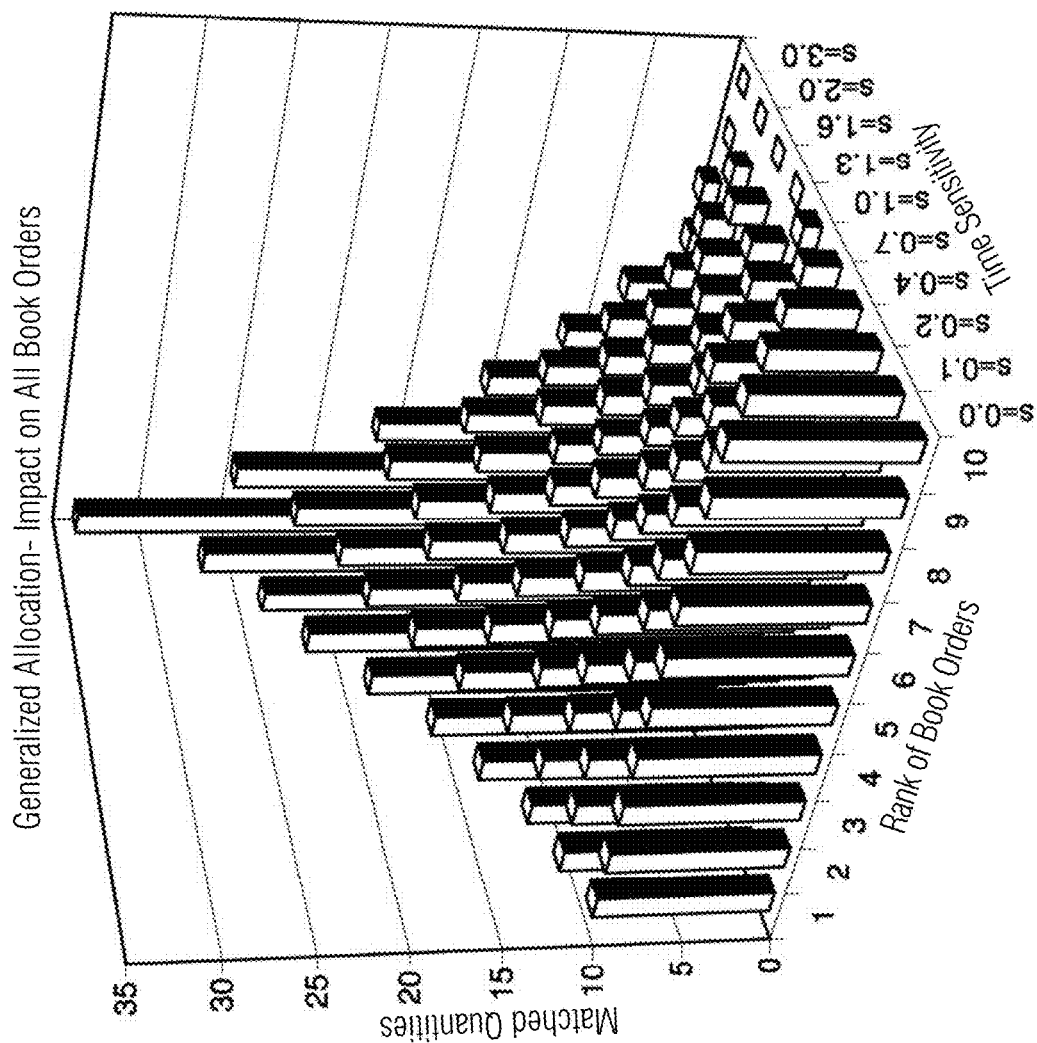
FIG. 6 illustrates matched quantity of 10 book orders having the same quantity and belonging to the same price level versus a time sensitivity parameter according to an embodiment.

Based on the specific order book scenario defined above, FIG. 6 shows the matched quantity $q_i^{match}(s)$ as defined in Equation (5) of each book order i=1, ..., 10 versus the time sensitivity parameter s for selected values of s. As can be seen from FIG. 6, a constant quantity allocation $q_i^{match}(s_0)$=10 valid in case of $s_0$=0 is shifted toward an asymmetric quantity allocation for $s_0$>0 where the first ranked orders have been allocated more quantity at the expense of the last ranked orders. For $s_0$=1.0, for example, the matched quantity of the first order (i=1) is almost doubled while the matched quantity of the last order (i=10) is decreased to 1 lot. The more the parameter value $s_0$ is increased, the more asymmetric the quantity allocation evolves. For very large $s_0$, the quantity allocation is concentrated in the very first orders while there is no matched quantity left for the remaining. Please note that the equation $$\sum_{i=1}^{10} q_i^{match}(s) = Q^{tba} = 100$$

holds for each fixed value of s.

The impact of the time sensitivity parameter can also be discussed by varying the time sensitivity parameter s in the step function $q_{i_0}^{match}(s)$ for a selected book order $i_0$. For $i_0$=1, a strongly monotone increase of the step function $q_1^{match}(s)$ for increasing values of s is observed. For $i_0$=n instead, the step function shows a strongly monotone decrease of $q_i^{match}(s)$ until, for a specific s, the quantity $q_n^{match}(s)$ is identical to zero. For any book order except the first or the last one, the step function $q_{i_0}^{match}(s)$ has a local maximum. As an example, for $i_0$=4, the step function $q_4^{match}(s)$ shows an initial increase from 10 to a local maximum of 13 matched quantities but from s>2.0 the quantity $q_4^{match}(s)$ decreases towards zero with increasing s.

Figure 7:
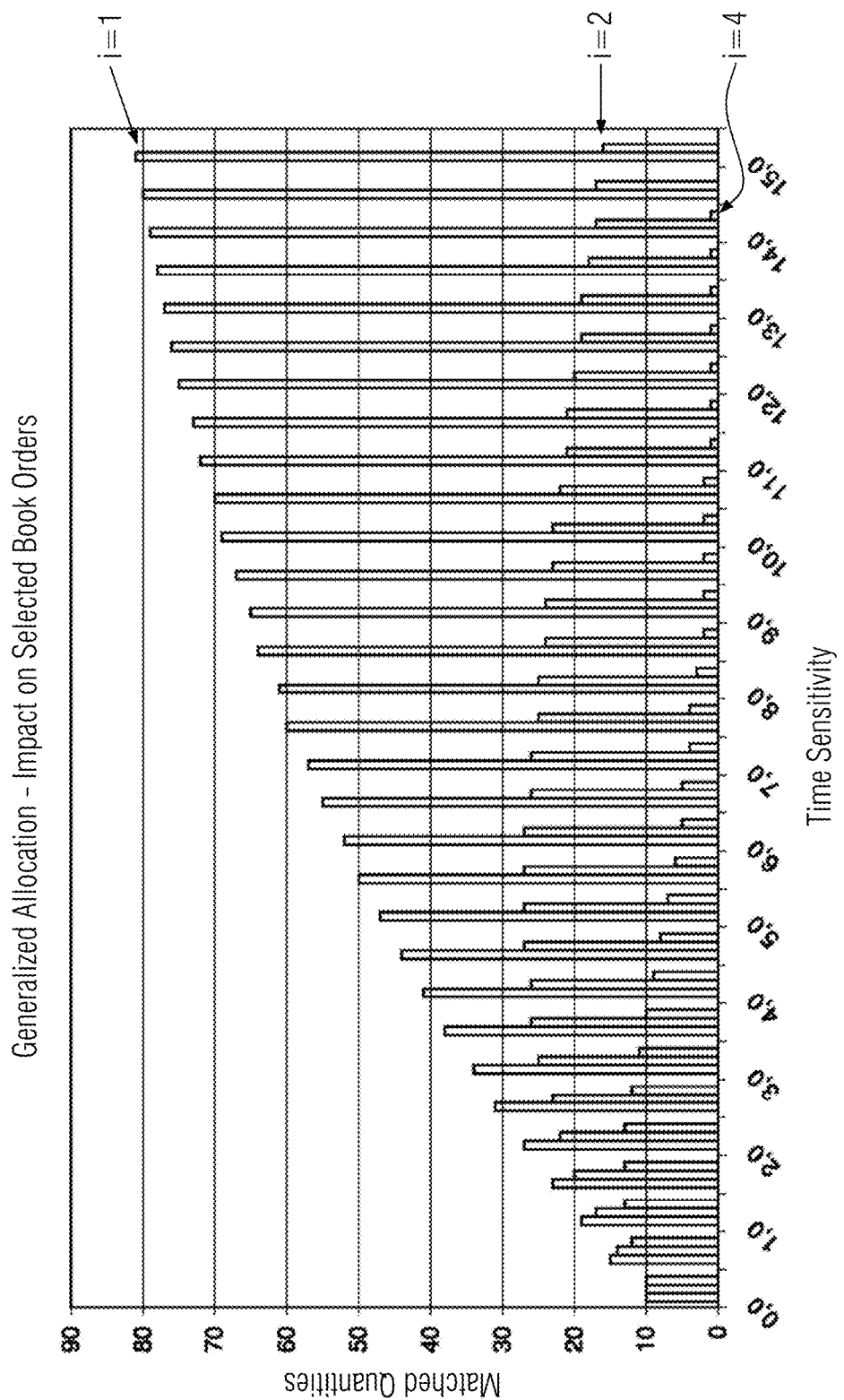
FIG. 7 illustrates a matched quantity of 3 order book orders versus a time sensitivity parameter according to an embodiment.

To discuss the impact of the time sensitivity parameter in more detail, FIG. 7 shows the time sensitivity of the matched quantities $q_{i_0}^{match}(s)$ provided by Equation (5) for the first, second and fourth order, i.e. for the orders $i_0$=1, $i_0$=2 and $i_0$=4. For the starting point s=0, $q_1^{match}$=$q_2^{match}$=$q_4^{match}$=10.

The value of $q_1^{match}(s)$ for the first book order is strongly increasing for increasing parameter values s. As an example, there is $q_1^{match}(1)$=19, $q_1^{match}(2)$=27 and $q_1^{match}(3)$=34 for s=1, s=2 and s=3, respectively. The larger the parameter value s gets, the smaller the value of $q_1^{match}(s)$ increases. For very large s, $q_1^{match}(s)$ approaches to the value of 100 which is consistent to the matched quantity of order $i_0$=1 in case time priority applies defined by Equation (8). However, $q_1^{match}(s)$ is slowly approaching its limit value of 100. For this reason, the time priority may be implemented separately and not treated as a special case of Equation (5) (or of Equation (1) and Equation (4) in case of a two-step approach).

For $0<i_0<n$, the step function $q_{i_0}^{match}(s)$ is initially increasing with increasing s, assumes a local maximum and, afterwards, is decreasing towards zero. However, the larger the value of $i_0$ is (i.e. the more the order is ranked last), the smaller the local maximum and the faster the matched quantity is approaching to zero and, consequently, the order is not considered anymore in the quantity allocation.

CONCLUSION

The matching algorithm exclusively applied during continuous trading phase may be performed as described with regard to FIGS. 3, 4 and 5 by the following steps:
Verification whether the incoming order satisfies the matching condition
If the incoming order satisfies the matching condition, then
  Determination of price best match paths available for matching on the outright order book side opposite to order book side of the incoming order; the best match paths may consider the direct match path (i.e. all price best orders of the outright order book) or all synthetic match paths up to a length of 3.)
  Selection and allocation of price best match paths in accordance with the path priority determined by the exchange.)
  Decomposition of allocated paths into generating outright order book sides and accumulation of the matched path quantities on generating outright order book side level to determine the allocated quantity of all generating outright order book sides involved in the synthetic match event.)
  Based on the quantity to be allocated in the generating outright order book sides, individual orders stored at the best price level of the corresponding generating order book side are selected for matching in accordance with an order allocation scheme determined by the exchange.)
  To derive the traded volume of a synthetic match event and to prepare the posting of the traded outright contracts for clearing purposes, the allocated quantity of the double leg outright order book sides are decomposed and summarized on single leg outright contract level.
  Update of outright order book side opposite to the incoming order and all generating outright order book sides involved in the synthetic match event.)
  Verify whether the incoming order still satisfies the matching condition or whether in remaining part of the incoming order is written to its outright order book side.
else
  Verify whether the incoming order improves its order book side; if yes, determine the new best public or new best match price of incoming outright order book side; in addition, verify whether other synthetic paths containing the incoming order book side as generating order book side are also improved or whether new synthetic paths based on the improved incoming order book side as generating order book side can be generated.)
  Verify whether the incoming order contributes to the best public or best match price level of the incoming order book side; if yes, determine the increased quantity available on the best public or best match price level of the incoming outright order book side; in addition, verify whether other synthetic paths containing the incoming order book side as generating order book side are also affected by the quantity update.)
  Write incoming order or remaining part of incoming order to incoming order book side.

The matching algorithm may be based on the following principles:
  Synthetic combinations are divided into public paths and match paths and restricted by their length; in general, the maximum match path length is two times the maximum public path length minus one; market information of public paths are published to the outside world while match paths are exclusively used for internal matching.
  By introducing a path priority supplementing the price priority, a two step matching algorithm is implemented; during the first step, the incoming order is allocated sequentially against paths in the order provided by the path priority; during the second step, the allocated paths are decomposed into and summarized by the generating outright order book sides and allocation of individual orders is based on these generating outright order book sides; the order allocation on generating outright order book side level is completely independent from the path allocation and can be chosen to be different for different generating outright order book sides.

As path allocation and order allocation are completely independent from each other, various order allocation schemes can be efficiently supported by the same synthetic matching algorithm.

In general, an order allocation scheme can be applied to allocate
  the quantity of an incoming order against the order book side opposing the incoming order book side in a direct match event
  the quantity determined in a synthetic matching algorithm against the generating order book sides involved in the synthetic match event
  the quantity to balance the auction price level in an auction price determination algorithm
indicating different aspects of the quantity to be allocated in an allocation scheme. The generalized order allocation scheme described in the present application may be applied to the aforementioned cases. The generalized order allocation scheme specified by Equation (1) and Equation (4) or Equation (5) is based on a parameterization regarding the impact of the order entry time on the order allocation and may be regarded as a very flexible allocation scheme used for the allocation of the quantity to be allocated against a plurality of orders stored in an order book side at a price level selected for execution.

Assuming that orders of a price level selected for execution are sequenced by their order entry time (i.e. oldest order is ranked first), the generalized order allocation scheme outlined with regard to method of FIG. 5 and also used in the method of FIG. 4 provides a common frame to conceptually cover via the time sensitivity parameter s the following specific order allocation schemes:
  I. Pure pro-rata allocation as described by Equation (6) representing a time sensitivity parameter of $s=0$ in Equation (5).
  II. Time-pro-rata allocation as described by Equation (1) and Equation (4) for any real number $s>0$. By choosing the fixed parameter value of $s=1$, the time-pro-rata allocation of Equation (7) is replacing the allocation provided by Equation (1) and Equation (4).

III. Time allocation given by Equation (8) which is derived from Equation (1) for the time sensitivity parameter s tending to infinity, i.e. for s→∞.

To use the flexibility provided by Equation (1) and Equation (4), the time sensitivity parameter s≥0 is introduced as an additional market model parameter valid on outright contract level. In doing so, a wide range of different allocation schemes can be applied to different outright contract of the same derivative product.

To avoid a loss of performance and unnecessary complexity, according to some embodiments, in case of s=0 representing the pure pro-rata allocation given by Equation (6) and in case of s→∞ representing the time allocation provided by Equation (8) may be implemented as separate order allocation schemes.

Figure 8:
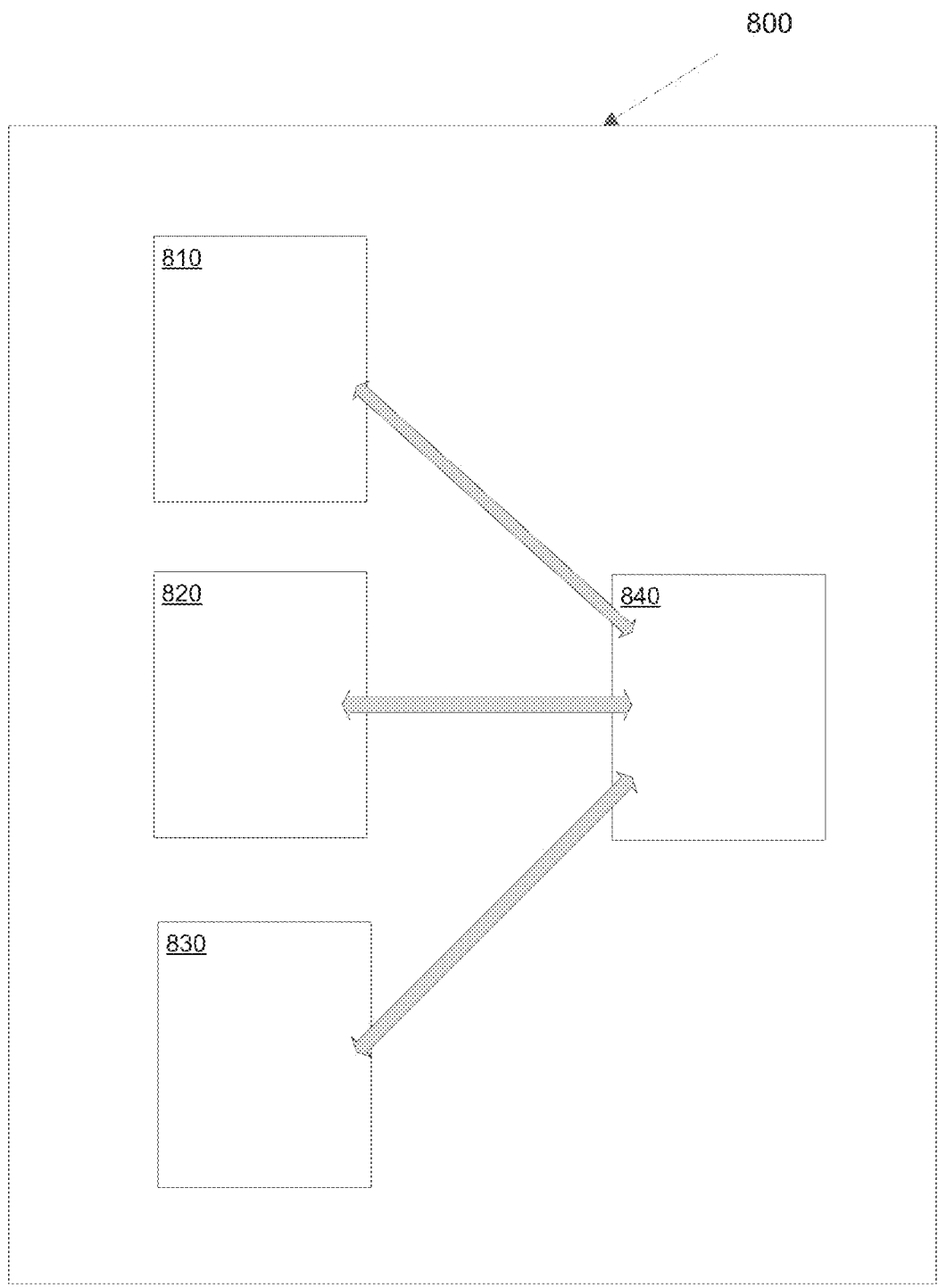
FIG. 8 is a schematic block diagram of a computer architecture for performing the disclosed methods.

FIG. 8 illustrates a computer architecture 800 for carrying out the methods disclosed with respect to FIG. 3, FIG. 4, and FIG. 5. As noted above, the computer architecture can include one or more computing devices having one or more processors. Instructions are recorded on tangible media and are executed by the one or more processors to carry out the disclosed functions. The architecture includes order evaluation element 810, synthetic matching element 820, and order allocation element 830. All three elements communicate with outright order book storage 840. The steps of FIG. 3 are performed by order evaluation element 810. The steps of FIG. 4 are performed by synthetic matching element 820. The steps of FIG. 5 are performed by order allocation element 830.

While the invention has been described with respect to the physical embodiments constructed in accordance herewith, it will be apparent to those skilled in the art that various modification, variation and improvements of the present invention may be made in the light of the above teachings and within the purview of the appended claims without departing from the spirit and intended scope of the invention. Accordingly, it is to be understood that the invention is not limited by the specific illustrative embodiments, but only by the scope of the appended claims.

The invention claimed is:

1. A computer-implemented method for maintaining deterministic combinations of single leg and double leg outright order book sides of a derivative product by one or more computing devices, the method comprising:

generating, by at least one of the one or more computing devices, allowed public paths available for a derivative product in an outright order book side of a plurality of outright order book sides based on combinations of single leg outright order book sides and double leg outright order book sides resulting to the outright order book side, wherein each of the allowed public paths has a path length less than or equal to a maximum public path length and wherein the path length indicates the number of different outright order book sides in a combination of outright order book sides resulting to the outright order book side;

determining, by at least one of the one or more computing devices, a best public limit of the outright order book side based on the allowed public paths available for the derivative product, wherein the best public limit is exclusively available for publication of a best price level of the outright order book side to the outside world;

generating, by at least one of the one or more computing devices, allowed match paths available for the derivative product in the outright order book side based on combinations of outright order book sides resulting to the outright order book side, wherein each of the allowed match paths has a path length less than or equal to a maximum matching path length and wherein the maximum matching path length is greater than the maximum public path length; and determining, by at least one of the one or more computing devices, a best match limit of the outright order book side based on the allowed match paths available for the derivative product, wherein the best match limit is exclusively available for matching of the outright order book side.

2. The computer-implemented method of claim 1, wherein an incoming outright order is entered during a continuous trading phase in an incoming outright order book side being one of the plurality of outright order book sides, the incoming outright order being associated with an incoming outright order limit, the method further comprising:

determining, by at least one of the one or more computing devices, a matching condition, the matching condition being a sum of the incoming outright order limit and a best match limit of an outright order book side opposing the incoming outright order book side, the outright order book side opposing the incoming outright order book side;

determining, by at least one of the one or more computing devices, if the matching condition is satisfied, wherein the matching condition is satisfied if the sum of the incoming outright order limit and the best match limit of the outright order book side opposing the incoming outright order book side is equal to or greater than zero.

3. The computer-implemented method of claim 2, wherein the best match limit available on the outright order book side opposing the incoming outright order book side comprises combinations of order book sides resulting to the outright order book side opposing the incoming outright order book side and wherein the combinations of outright order book sides resulting to the outright order book side opposing the incoming outright order book side are based on the allowed match paths available for the outright order book side opposing the incoming outright order book side.

4. The computer-implemented method of claim 3, further comprising:

matching, by at least one of the one or more computing devices, the incoming outright order against the outright order book side opposing the incoming outright order book side based at least in part on a determination that the incoming outright order satisfies the matching condition, wherein matching the incoming outright order comprises determining best match paths of the outright order book side opposing the incoming outright order book side.

5. The computer-implemented method of claim 4, wherein matching the incoming outright order further comprises:

determining a path priority applied to all determined best match paths based at least in part on a determination that there is more than one best match path, the path priority being one of a path priority of small length, a path priority of large length and a pro-rata path priority, the path priority specifying which best match paths are considered first for the execution against the incoming outright order.

6. The computer-implemented method of claim 5, wherein an incoming order quantity is associated with the incoming outright order and wherein matching the incoming outright order further comprises:

allocating the incoming order quantity to the determined price best match paths in the sequence of the price best match paths provided by the path priority and specifying an allocated path quantity for the price best match paths.

7. The computer-implemented method of claim 6, wherein matching the incoming outright order further comprises:
  decomposing the allocated price best match paths into their respective generating order book sides; and
  accumulating the allocated path quantity of the same generating order book sides involved in different price best match paths resulting to a quantity to be allocated against the generating order book sides.

8. The computer-implemented method of claim 7, wherein matching the incoming outright order further comprises:
  performing an individual order allocation in all generating order book sides in accordance with an order allocation scheme, wherein the quantity to be allocated in each generating order book side is allocated to price best orders of the same generating order book side.

9. The computer-implemented method of claim 8, wherein matching the incoming outright order further comprises:
  updating the order book side opposing the incoming outright order book side and its corresponding best public limit and best match limit and updating all generating order book sides involved in the match event after the allocation process in all generating order book sides has been concluded and the corresponding orders contained in the generating order book sides have been matched.

10. The computer-implemented method of claim 9, wherein matching the incoming outright order further comprises:
  determining whether there is still incoming order quantity available;
  concluding the match event triggered by the incoming outright order based at least in part on a determination that the incoming order quantity is completely matched at the previous best match limit of the updated outright order book side opposing the incoming outright order book side;
  matching of the remaining incoming outright order continues at the lower best match limit of the updated outright order book side opposing the incoming outright order book side based at least in part on a determination that the incoming order quantity is not completely consumed and the matching condition is still satisfied for a lower best match limit level of the updated outright order book side opposing the incoming outright order book side;
  writing the incoming outright order to the incoming outright order book side and updating the best price level of the incoming outright order book side by setting the best price level of the incoming outright order book side identical to the incoming outright order limit based at least in part on a determination that the incoming order quantity is not completely consumed and the matching condition is not satisfied for a lower best match limit of the updated outright order book side opposing the incoming outright order book side;
  updating the best public limit or best match limit and its associated best public paths and best match paths of the incoming outright order book side based at least in part on a determination that the best public limit or the best match limit of the incoming outright order book side are improved by the update of the best price level of the incoming outright order book side; and
  updating the best public limit or best match limit of the corresponding outright order book side based at least in part on a determination that the best public limit or the best match limit of outright order book sides different from the incoming outright order book side but containing the incoming outright order book side as generating outright order book side are affected, and concluding the match event triggered by the incoming outright order.

11. The computer-implemented method of claim 2, wherein the matching condition is not satisfied if the sum of the incoming outright order limit and the best match limit of the outright order book side opposing the incoming outright order book side is a negative number.

12. The computer-implemented method of claim 11, further comprising:
  writing, by at least one of the one or more computing devices, the incoming outright order to the incoming outright order book side based at least in part on a determination that the incoming outright order limit is worse than the best price level of the incoming outright order book side.

13. The computer-implemented method of claim 12, wherein an incoming order quantity is associated with the incoming outright order, the method further comprising:
  performing, by at least one of the one or more computing devices, the following steps based at least in part on a determination that the incoming outright order limit is equal to the best price level of the incoming outright order book side:
    updating the quantity associated with the best price level of the incoming outright order book side by adding the incoming order quantity to the quantity associated with the best price level of the incoming outright order book side;
    verifying whether the incoming outright order book side contributes to the best public limit or to the best match limit of the incoming outright order book side;
    updating the quantity associated with the best public limit or with the best match limit based at least in part on a determination that the incoming outright order book side contributes to the best public limit or to the best match limit of the incoming outright order book side;
    verifying whether the incoming outright order book side contributes to a best public limit or a best match limit of an outright order book side different from the incoming outright order book side but containing the incoming outright order book side as generating order book side;
    updating the quantity associated with the best public limit or with the best match limit of the corresponding outright order book side different from the incoming outright order book side based at least in part on a determination that the incoming outright order book side contributes as a generating order book side to the best public limit or the best match limit of the outright order book side different from the incoming outright order book side; and
    writing the incoming outright order to the incoming outright order book side.

14. The computer-implemented method of claim 13, further comprising:

performing, by at least one of the one or more computing device, the following steps based at least in part on a determination that the incoming outright order limit is better than the best limit of the incoming outright order book side:
  setting the best price level of the incoming outright order book side to the incoming outright order limit;
  verifying whether the improvement of the best price level of the incoming outright order book side contributes to the best public limit or the best match limit of the incoming outright order book side;
  improving the best public limit or the best match limit of the incoming outright order book side by setting the best public or the best match limit of the incoming outright order book side to the incoming outright order limit based at least in part on a determination that the improvement of the best price level of the incoming outright order book side contributes to the best public limit or the best match limit of the incoming outright order book side;
  verifying whether the improvement of the best price level of the incoming outright order book side results to a best public limit or a best match limit of outright order book sides different from the incoming outright order book side but containing the incoming outright order book side as generating order book side;
  recalculating the best public limit or the best match limit of the outright order book side different from the incoming outright order book side based at least in part on a determination that the improvement of the best price level of the incoming outright order book side contributes as a generating order book side to the best public limit or best match limit of an outright order book side different from the incoming outright order book side; and
  writing the incoming outright order to the incoming outright order book side.

15. At least one non-transitory computer-readable medium storing computer-readable instructions that, when executed by one or more computing devices, cause at least one of the one or more computing devices to:
  generate allowed public paths available for a derivative product in an outright order book side of a plurality of outright order book sides based on combinations of single leg outright order book sides and double leg outright order book sides resulting to the outright order book side, wherein each of the allowed public paths has a path length less than or equal to a maximum public path length and wherein the path length indicates the number of different outright order book sides in a combination of outright order book sides resulting to the outright order book side;
  determine a best public limit of an outright order book side of the outright order book side based on the allowed public paths available for the derivative product, wherein the best public limit is exclusively available for publication of a best price level of the outright order book side to the outside world;
  generate allowed match paths available for the derivative product in the outright order book side based on combinations of outright order book sides resulting to the outright order book side, wherein each of the allowed match paths has a path length less than or equal to a maximum matching path length and wherein the maximum matching path length is greater than the maximum public path length; and
  determine a best match limit of the outright order book side based on the allowed match paths available for the derivative product, wherein the best match limit is exclusively available for matching of the outright order book side.

16. A matching engine comprising:
one or more processors; and
one or more memories operatively coupled to at least one of the one or more processors and having instructions stored thereon that, when executed by at least one of the one or more processors, cause at least one of the one or more processors to:
  generate allowed public paths available for a derivative product in an outright order book side of a plurality of outright order book sides based on combinations of single leg outright order book sides and double leg outright order book sides resulting to the outright order book side, wherein each of the allowed public paths has a path length less than or equal to a maximum public path length and wherein the path length indicates the number of different outright order book sides in a combination of outright order book sides resulting to the outright order book side;
  determine a best public limit of the outright order book side based on the allowed public paths available for the derivative product, wherein the best public limit is exclusively available for publication of a best price level of the outright order book side to the outside world;
  generate allowed match paths available for the derivative product in the outright order book side based on combinations of outright order book sides resulting to the outright order book side, wherein each of the allowed match paths has a path length less than or equal to a maximum matching path length and wherein the maximum matching path length is greater than the maximum public path length; and
  determine a best match limit of the outright order book side based on the allowed match paths available for the derivative product, wherein the best match limit is exclusively available for matching of the outright order book side.

* * * * *